US011313671B2

(12) United States Patent
Sesko

(10) Patent No.: US 11,313,671 B2
(45) Date of Patent: Apr. 26, 2022

(54) CHROMATIC CONFOCAL RANGE SENSING SYSTEM WITH ENHANCED SPECTRUM LIGHT SOURCE CONFIGURATION

(71) Applicant: Mitutoyo Corporation, Kanagawa-ken (JP)

(72) Inventor: David William Sesko, Woodinville, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 238 days.

(21) Appl. No.: 16/424,226

(22) Filed: May 28, 2019

(65) Prior Publication Data

US 2020/0378747 A1     Dec. 3, 2020

(51) Int. Cl.
*G01B 11/06* (2006.01)
*G01J 3/02* (2006.01)
*G01J 3/28* (2006.01)

(52) U.S. Cl.
CPC ........ *G01B 11/0608* (2013.01); *G01J 3/0208* (2013.01); *G01J 3/0218* (2013.01); *G01J 3/2803* (2013.01); *G01B 2210/50* (2013.01)

(58) Field of Classification Search
CPC ... G01B 11/0608; G01J 3/0208; G01J 3/0218; H01L 33/507
See application file for complete search history.

(56) References Cited

U.S. PATENT DOCUMENTS

| | | | |
|---|---|---|---|
| 5,813,752 A | 9/1998 | Singer et al. | |
| 5,813,753 A | 9/1998 | Vriens et al. | |

(Continued)

FOREIGN PATENT DOCUMENTS

| | | |
|---|---|---|
| CN | 104279953 A | 1/2015 |
| EP | 1 447 853 B1 | 8/2012 |

(Continued)

OTHER PUBLICATIONS

Chanbai, "Development of a Confocal Line Scanning Sensor," Doctoral Dissertation, Institut für Automatisierungstechnik, Dresden, Oct. 22, 2012, 171 pages.

(Continued)

*Primary Examiner* — Rebecca C Bryant
(74) *Attorney, Agent, or Firm* — Seed IP Law Group LLP

(57) ABSTRACT

A confocal range sensing (CRS) system is provided including a wavelength detector, source light configuration, and one or more measurement channels. Each measurement channel is configured to sense a respective distance to a workpiece surface and includes a confocal detection aperture and confocal light source aperture. The source light configuration includes first and second phosphor compositions, a wavelength combining configuration, and a shared source light path. The first and second phosphor compositions are located in separate respective first and second phosphor regions. As part of workpiece height measurement operations, the first and second phosphor compositions emit first and second emitted light, respectively, to the wavelength combining configuration which outputs first and second emitted light along the shared source light path as source light (i.e., having an extended wavelength range due to the combination of the first and second emitted light) that is received by each respective confocal light source aperture.

25 Claims, 10 Drawing Sheets

(56) References Cited

U.S. PATENT DOCUMENTS

| | | |
|---|---|---|
| 5,959,316 A | 9/1999 | Lowery |
| 5,998,925 A | 12/1999 | Shimizu et al. |
| 6,051,925 A | 4/2000 | Boerner et al. |
| 6,066,861 A | 5/2000 | Hön et al. |
| 6,069,440 A | 5/2000 | Shimizu et al. |
| 6,084,250 A | 7/2000 | Jüstel et al. |
| 6,204,523 B1 | 3/2001 | Carey et al. |
| 6,255,670 B1 | 7/2001 | Srivastava et al. |
| 6,351,069 B1 | 2/2002 | Lowery et al. |
| 6,417,019 B1 | 7/2002 | Mueller et al. |
| 6,501,102 B2 | 12/2002 | Mueller-Mach et al. |
| 6,576,488 B2 | 6/2003 | Collins, III et al. |
| 6,590,235 B2 | 7/2003 | Carey et al. |
| 6,603,258 B1 | 8/2003 | Mueller-Mach et al. |
| 6,608,332 B2 | 8/2003 | Shimizu et al. |
| 6,614,179 B1 | 9/2003 | Shimizu et al. |
| 6,641,448 B2 | 11/2003 | Wang et al. |
| 6,642,618 B2 | 11/2003 | Yagi et al. |
| 6,645,652 B2 | 11/2003 | Cownden et al. |
| 6,650,044 B1 | 11/2003 | Lowery |
| 6,680,569 B2 | 1/2004 | Mueller-Mach et al. |
| 6,686,691 B1 | 2/2004 | Mueller et al. |
| 6,717,353 B1 | 4/2004 | Mueller et al. |
| 6,765,237 B1 | 7/2004 | Doxsee et al. |
| 6,791,116 B2 | 9/2004 | Takahashi et al. |
| 6,939,481 B2 | 9/2005 | Srivastava et al. |
| 7,026,755 B2 | 4/2006 | Setlur et al. |
| 7,083,490 B2 | 8/2006 | Mueller et al. |
| 7,088,038 B2 | 8/2006 | Srivastava et al. |
| 7,111,921 B2 | 9/2006 | Yoshida |
| 7,235,792 B2 | 6/2007 | Elofson |
| 7,279,832 B2 | 10/2007 | Thurk et al. |
| 7,324,682 B2 | 1/2008 | Wasserman |
| 7,408,201 B2 * | 8/2008 | Keuper ............... H01L 33/0004 257/98 |
| 7,443,413 B2 | 10/2008 | Jodra et al. |
| 7,454,053 B2 | 11/2008 | Bryll et al. |
| 7,876,456 B2 | 1/2011 | Sesko |
| 8,085,295 B2 | 12/2011 | Tobiason et al. |
| 8,142,050 B2 | 3/2012 | Emtman et al. |
| 8,194,251 B2 | 6/2012 | Emtman et al. |
| 8,212,997 B1 | 7/2012 | Xie |
| 8,317,347 B2 | 11/2012 | Gladnick et al. |
| 8,587,772 B2 | 11/2013 | Sesko et al. |
| 8,587,789 B2 | 11/2013 | Sesko |
| 8,736,817 B2 | 5/2014 | Jones et al. |
| 8,860,931 B2 | 10/2014 | Patzwald |
| 8,928,874 B2 | 1/2015 | Patzwald |
| 9,068,822 B2 * | 6/2015 | Sesko .................. G01B 11/14 |
| 9,115,982 B2 | 8/2015 | Jones et al. |
| 9,134,519 B2 | 9/2015 | Berman |
| 9,261,351 B1 | 2/2016 | Patzwald |
| 9,329,026 B2 | 5/2016 | Altendorf |
| 9,341,343 B2 | 5/2016 | Bruemmer et al. |
| 9,651,764 B2 | 5/2017 | Harsila |
| 9,774,765 B2 | 9/2017 | Bryll et al. |
| 9,829,312 B2 | 11/2017 | Xie |
| 9,958,266 B2 | 5/2018 | Patzwald et al. |
| 2004/0135504 A1 | 7/2004 | Tamaki et al. |
| 2005/0031191 A1 | 2/2005 | Venkatachalam |
| 2005/0208302 A1 | 9/2005 | Yi et al. |
| 2005/0255629 A1 | 11/2005 | Han et al. |
| 2006/0109483 A1 | 5/2006 | Marx et al. |
| 2009/0072255 A1 | 3/2009 | Takahashi et al. |
| 2010/0097779 A1 | 4/2010 | Gladnick et al. |
| 2010/0188742 A1 | 7/2010 | Chen et al. |
| 2011/0199753 A1 | 8/2011 | Ramer et al. |
| 2014/0185272 A1 * | 7/2014 | Kishimoto .............. F21V 29/74 362/84 |
| 2014/0340869 A1 | 11/2014 | Wang et al. |
| 2015/0009484 A1 | 1/2015 | Sesko |
| 2016/0355732 A1 * | 12/2016 | Miyagawa ............ C04B 35/44 |
| 2017/0321866 A1 * | 11/2017 | Asami .................. F21S 41/141 |

FOREIGN PATENT DOCUMENTS

| | | |
|---|---|---|
| JP | 10-112557 A | 4/1998 |
| JP | 11-46019 A | 2/1999 |
| JP | 3419280 B2 | 4/2003 |
| WO | 02/054502 A1 | 7/2002 |
| WO | 02/054503 A1 | 7/2002 |

OTHER PUBLICATIONS

Kagawa et al., "Multi-beam confocal microscopy based on a custom image sensor with focal-plane pinhole array effect," Optics Express 21(2):1417-1429, 2013, (14 pages).

Slide show/PowerPoint presentation "Phosphor Converted White LED," downloaded from: https://www.slideserve.com/ofira/phosphor-converted-white-led, slides 1-59, Sep. 12, 2014.

* cited by examiner

CHROMATIC CONFOCAL RANGE SENSING SYSTEM WITH ENHANCED SPECTRUM LIGHT SOURCE CONFIGURATION

BACKGROUND

Technical Field

This disclosure relates to precision metrology, and more particularly to high-intensity light sources suitable for use in precision measurement instruments such as chromatic confocal range sensors.

Description of the Related Art

Various uses are known for high-intensity broadband light sources. For example, it is known to use such light sources with chromatic confocal techniques in optical height or distance sensors (i.e., range sensors). As described in U.S. Pat. No. 7,876,456 (the '456 patent), which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or distance relative to the focusing element determines which wavelength is best focused. Upon reflection from the surface, the light is refocused onto a small detector aperture, such as a pinhole or the end of an optical fiber. Upon reflection from the surface and passing back through the optical system to the in/out fiber, only the wavelength that is well-focused on the surface is well-focused on the aperture. All of the other wavelengths are poorly focused on the aperture, and so will not couple much power into the fiber. Therefore, for the light returned through the fiber, the signal level will be greatest for the wavelength corresponding to the surface height or distance to the surface. A spectrometer type detector measures the signal level for each wavelength, in order to determine the surface height.

Certain manufacturers refer to certain practical and compact confocal range sensing (CRS) systems that operate as described above, and that are suitable for use in an industrial setting, as chromatic point sensors (CPS) or chromatic line sensors, or the like. A compact chromatically-dispersive optical assembly used with such systems may in some instances be referred to as an "optical pen," or a "pen." The optical pen is connected through an optical fiber to an electronic portion of the chromatic point sensor which transmits light through the fiber to be output from the optical pen and which provides a spectrometer that detects and analyzes the returned light. The returned light forms a wavelength-dispersed intensity profile received by the spectrometer's detector array. Pixel data corresponding to the wavelength-dispersed intensity profile is analyzed to determine the "dominant wavelength peak pixel coordinate" as may be indicated by a peak or centroid of the intensity profile, and the dominant wavelength peak pixel coordinate is used with a lookup table and/or other stored calibration data to determine the distance to the surface. The dominant wavelength peak pixel coordinate may be determined with sub-pixel resolution, and may be referred to as the "distance-indicating pixel coordinate."

Also known in the art is a type of CRS system which includes a "line sensor" that uses a slit aperture and focuses light along a line rather than a point, providing the capability to measure a distance to a surface at a number of points along that line, as disclosed in U.S. Patent Application Publication No. 2010/0188742, which is hereby incorporated herein by reference in its entirety.

In certain previously known implementations, a Xenon arc lamp has been used as a high intensity broadband (e.g., white) light source for a CRS system having a measurement rate on the order of 30 kHz. A Xenon arc lamp provides broadband light emission that covers the spectral range, and hence the height measurement range, of a CRS system. It is also a high intensity light source with sufficient energy for obtaining a good S/N ratio at a measurement rate of about 30 kHz and the readout time of about 33 µs ($=\frac{1}{30} \times 10^{-3}$). However, in practical applications, a Xenon arc lamp exhibits certain undesirable characteristics, such as a less than desirable lifetime and arc spatial stability. A spatially stable, long lifetime light source is desirable in order to minimize any variation in CRS calibration due to changes in the light source spectral emission with arc movement, and also to minimize the downtime of a CRS system. Further, many manufactured workpieces include hybrid materials, which have different reflectance characteristics and thus are saturated at different brightnesses. Thus, a CRS light source can preferably be brightness modulated (e.g., from less to more brightness) at a rate equal to or greater than the CRS measurement rate (e.g., 30 kHz) to allow measurement of hybrid materials. Such high rate light modulation has not been practical with certain known Xenon arc lamps. Similar light source deficiencies are also found in association with other instrument applications, such as spectrometers, and the like.

U.S. Patent Application Publication No. US2010/0097779 A1 (the '779 publication), which is commonly assigned and hereby incorporated herein by reference in its entirety, discloses a high intensity light source wherein a light emitting phosphor or the like is distributed on a movable member, which is moved continuously through a fixed illuminated spot and emitted light output coupling region. The disclosed configurations are superior to Xenon light sources in many respects, and are particularly suitable as high intensity light sources that have a long operating life, that provide high modulation rates, and that efficiently and economically couple light into an optical fiber, among other advantages. Thus, such light sources are well suited for CRS systems such as that outlined above, for example. In addition, U.S. Pat. No. 8,317,347 (the '347 patent), which is also commonly assigned and hereby incorporated herein by reference in its entirety, discloses a high intensity light source configuration that addresses certain issues related to phosphor output variations (e.g., at different locations on a phosphor point source element) which may affect the production of an illumination spectrum. Such high intensity light sources (e.g., utilizing light emitting phosphor) may typically be pumped by an excitation light source (e.g., a 450 nm LED).

For various applications, improvements in certain aspects of such high intensity light sources (e.g., utilizing light emitting phosphor) are desirable (e.g., for achieving improved operating characteristics for measurement and/or other operations, etc.)

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A confocal range sensing (CRS) system is provided including a wavelength detector, a source light configuration, and one or more measurement channels. Each measurement channel of the one or more measurement channels is configured to sense a respective distance to a workpiece surface and includes a respective confocal detection aperture and a respective confocal light source aperture. For each measurement channel, the respective confocal detection aperture is configured to receive reflected focused measurement light from the workpiece surface along a measurement optical path and transmit spatially filtered measurement light to the wavelength detector. For each measurement channel, the respective confocal light source aperture is configured to receive source light from the source light configuration and transmit at least a portion of the source light along an input path to a measurement path lens configuration. The measurement path lens configuration is configured to input the source light from the respective confocal light source aperture and output focused measurement light with axial chromatic dispersion to the workpiece surface and receive reflected focused measurement light from the workpiece surface and focus the reflected focused measurement light proximate to the respective confocal detection aperture.

The source light configuration includes an excitation light configuration, a first phosphor composition, a second phosphor composition, a wavelength combining configuration, and a shared source light path. The excitation light configuration includes one or more excitation light sources that produce excitation light. The first phosphor composition is located in a first phosphor region and the second phosphor composition is located in a second phosphor region that is separate from the first phosphor region. The excitation light configuration outputs the excitation light to the first phosphor region and the second phosphor region and in response to which the first and second phosphor compositions emit first and second emitted light, respectively, to the wavelength combining configuration which is configured to output at least some of the first emitted light and second emitted light along the shared source light path as the source light that is received by each respective confocal light source aperture. The first emitted light and the second emitted light have different first and second peak wavelengths, respectively. As a result of the combination of the first and second emitted light, the source light has an extended wavelength range which corresponds to an enhanced spectrum of the source light configuration.

DETAILED DESCRIPTION

Figure 1:
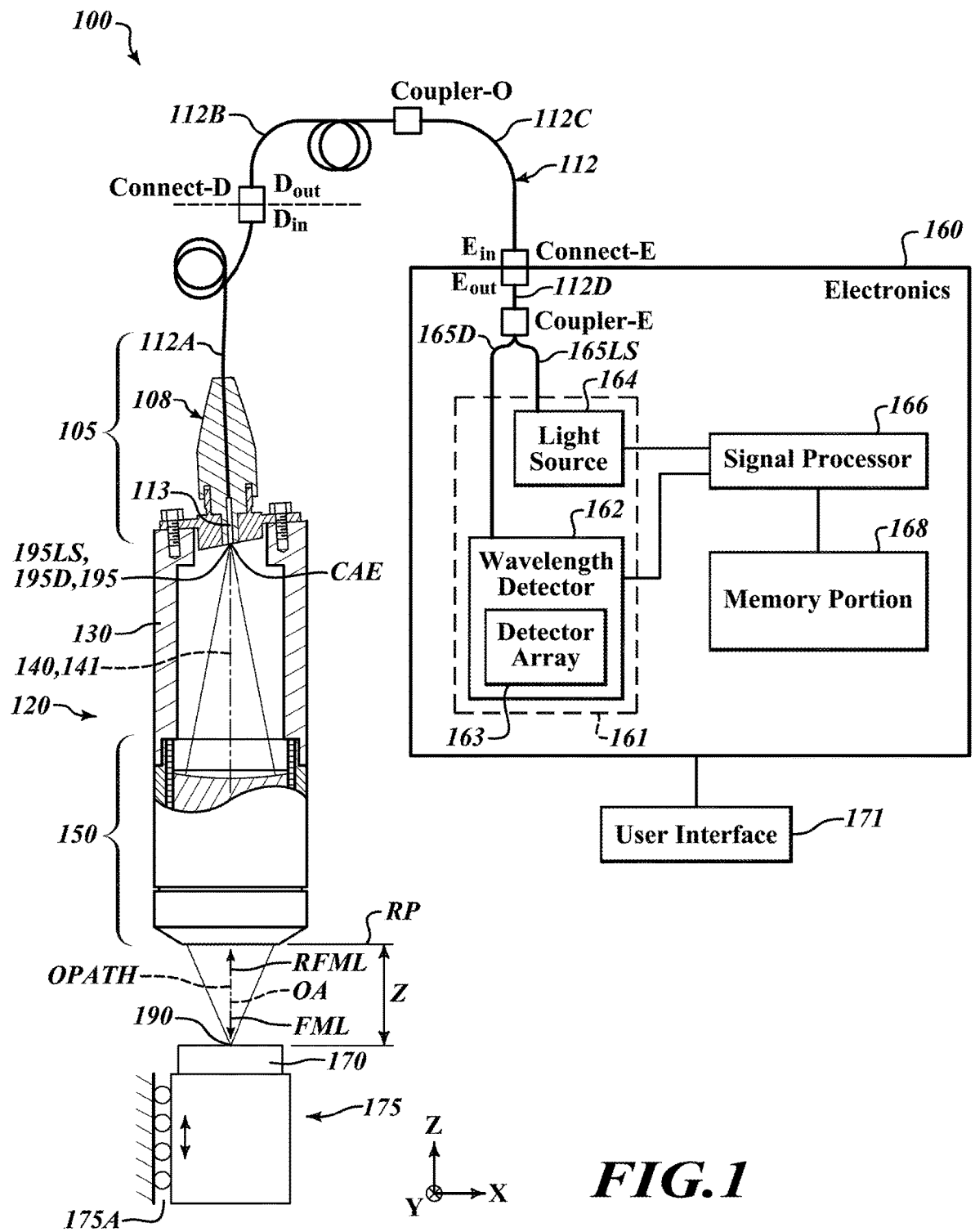
FIG. 1 is a diagram of a first exemplary implementation of a CRS system.

FIG. 1 is a block diagram of one exemplary implementation of a confocal range sensing system 100, including an optical element 120 (e.g., an optical pen), an electronics portion 160, and a user interface portion 171. The electronics portion 160 includes a signal processor 166, a memory portion 168 and a source and detector subsystem 161 comprising a wavelength detector 162, and a broadband light source 164. In accordance with principles disclosed herein, in various implementations the light source 164 may include a source light configuration utilizing phosphor compositions, as will be described in more detail below with respect to FIGS. 3A and 3B.

The CRS system 100 shown in FIG. 1 is a chromatic point sensor (CPS) system which measures a single measurement point at a time. In various implementations, the wavelength detector 162 includes a detector array 163 of a spectrometer. The detector array 163 may comprise a plurality of pixels distributed along a measurement axis of the wavelength detector 162, wherein the plurality of pixels receive respective wavelengths and provide measurement spectral intensity profile data. The electronics portion 160 is coupled to the optical element 120 through an optical path (e.g., an optical fiber path) including a fiber optic cable segment 112. Optional or alternative aspects of the optical path are shown, including the fiber optic cable segment 112 which includes segments 112A, 112B, 112C and 112D, as well as various connectors and couplers. The first and second segments 112A and 112B are joined at a connector CONNECT-D, and a coupler COUPLER-O joins the segment 112B to the segment 112C, which is coupled by the connector CONNECT-E to the segment 112D in the electronics portion 160. The light source 164, which is controlled by the signal processor 166, is connected to input a spectral profile of wavelengths to the optical element 120 through a path including a source fiber segment 165LS, a 2×1 coupler COUPLER-E, the segment 112D, the connector CONNECT-E, and the remaining sections of the fiber optic cable segment 112 as described above. The optical element 120 includes an in/out fiber optic sub-assembly 105, a housing 130, and a measurement path lens configuration 150. The in/out fiber optic sub-assembly 105 comprises an in/out optical fiber 113 carried through the fiber optic cable 112 which encases it, and a fiber optic connector 108. The in/out optical fiber 113 outputs an output beam through an aperture 195 (e.g., a confocal aperture end), and receives reflected measurement signal light through the aperture 195.

As will be described in more detail below, in various implementations the confocal aperture 195 may be part of a measurement channel that is configured to sense a distance to a surface location 190 on a surface of a workpiece 170. In various implementations, the confocal aperture 195 may function as both a confocal light source aperture 195LS and a confocal detection aperture 195D, as part of the measurement channel. As will be described in more detail below with respect to FIGS. 4-6, in various alternative implementations, a confocal light source aperture and a confocal detection aperture of a measurement channel may be separate elements at different locations.

As a general overview of the operations of the CRS system 100, the confocal aperture 195 (i.e., functioning as the confocal light source aperture 195LS) is configured to receive source light from a source light configuration (e.g., source light configuration 364C of FIGS. 3A and 3B) of the light source 164. The confocal light source aperture 195LS transmits at least a portion of the source light along an input path 140 to a measurement path lens configuration 150 that is configured to input the source light from the respective confocal light source aperture 195LS and output focused measurement light FML with axial chromatic dispersion to the workpiece surface 190. The measurement path lens configuration 150 receives reflected focused measurement light RFML as reflected from the workpiece surface 190 and focuses the reflected focused measurement light RFML proximate to the confocal aperture 195 (i.e., functioning as the confocal detection aperture 195D). The confocal detection aperture 195D is thus configured to receive reflected focused measurement light RFML from the workpiece surface 190 along a measurement optical path 141 and transmit spatially filtered measurement light to the wavelength detector 162.

As a more specific description of the operations of the CRS system 100, light emitted from the fiber end through the aperture 195 (i.e., functioning as the confocal light source aperture 195LS) is focused by the measurement path lens configuration 150, which includes a lens that provides an axial chromatic dispersion such that the focal point along the optical axis OA is at different distances depending on the wavelength of the light, as is known for certain CRS systems. During measurement operations, the light is output from the measurement path lens configuration 150 as focused measurement light FML which is focused on a surface location 190 of a surface of the workpiece 170. Light reflected from the surface location 190 (i.e., reflected focused measurement light RFML) travels along an optical path OPATH (e.g., as may be part of an overall measurement optical path 441) and is refocused by the measurement path lens configuration 150 onto the aperture 195 (i.e., functioning as the confocal detection aperture 195D). Due to the axial chromatic dispersion, only one wavelength will have the focus distance that matches the measurement distance "Z", which is the distance from a reference position RP that is fixed relative to the optical element 120 to the surface location 190. The wavelength that is best focused at the surface location 190 is the best focused wavelength at the confocal aperture 195 (i.e., functioning as the confocal detection aperture 195D). Thus, predominantly the best focused wavelength passes through the confocal aperture 195 and into the core of the optical fiber 113 of the fiber optic cable segment 112 as spatially filtered measurement light. The fiber optic cable segment 112 routes the spatially filtered measurement light to the wavelength detector 162 that is utilized for determining the wavelength having the dominant intensity, which corresponds to the measurement distance Z to the surface location 190.

In the example configuration of FIG. 1, the measurement channel for the CRS system 100 may be defined as including at least an optical fiber path that includes the source fiber segment 165LS, the detector fiber segment 165D, the confocal aperture segment 112A and the fiber combiner/splitter COUPLER-E. The source and detector fiber segments 165LS and 165D are coupled to a first side of the fiber combiner/splitter COUPLER-E, and the confocal aperture segment 112A is coupled (e.g., through various other segments and components of the fiber segment 112) to a second side of the fiber combiner/splitter COUPLER-E. The source fiber segment 165LS is configured with one end arranged to input the source light from the light source 164, and to transmit the source light through the fiber combiner/splitter COUPLER-E (and through various other segments and components) to the confocal aperture segment 112A (as described above).

In various implementations, the confocal aperture segment 112A is configured with a confocal aperture end CAE arranged to provide the confocal aperture 195 that provides/functions as both the confocal light source aperture 195LS and the confocal detection aperture 195D. As described above, the confocal light source aperture 195LS transmits the source light along an input path 140 to the measurement path lens configuration 150. The confocal detection aperture 195D receives reflected focused measurement light from the workpiece surface location 190 along the measurement optical path 141. The confocal aperture segment 112A is further configured to transmit (e.g., through various other fiber segments and components) the reflected focused measurement light RFML to the detector fiber segment 165D as spatially filtered measurement light through the fiber combiner/splitter COUPLER-E. The detector fiber segment 165D is configured with one end arranged to transmit the spatially filtered measurement light to the wavelength detector 162.

In the illustrated implementation, the spatially filtered measurement light passes back through the coupler COUPLER-E so that approximately 50% of the light is directed through the detector fiber segment 165D to the wavelength detector 162 (e.g., and for which in various implementations there may have been another 50% coupler insertion loss). The wavelength detector 162 receives the wavelength-dependent light intensity, converts it to an output spectral intensity profile (also referred to simply as an output spectral profile) distributed over an array of pixels along a measuring axis of the detector array 163, and operates to provide corresponding output spectral profile data based on pixel data output from the detector array 163 (e.g., as will be described in more detail below with respect to FIGS. 8 and 9A-9C).

In various implementations, the subpixel-resolution distance-indicating coordinate (DIC) of the profile data may be calculated by the signal processor 166, and the DIC (in subpixels) determines the measurement distance Z to the surface location 190 (in microns) via a distance calibration lookup table or the like, which may be stored in the memory portion 168. The DIC may be determined by various methods (e.g., by determining the centroid of intensity profile data included in a peak region, etc.). The profile data may be used to determine the DIC with subpixel resolution.

The user interface portion 171 is coupled to the electronics portion 160 and is configured to receive user input used for the operation of the CRS system 100, such as user selection of sampling rates or other operating parameters, etc., via any suitable means such as a keyboard, touch sensor, mouse, etc. The user interface portion 171 is also configured to display information on a screen, such as a distance (e.g., a workpiece height measurement) successfully measured by the CRS system 100.

FIG. 1 includes orthogonal XYZ coordinate axes, as a frame of reference (e.g., including with respect to the measurements of the workpiece 170). The Z direction is defined to be parallel to the optical axis OA, which is the distance/height measuring axis, of the optical element 120. As illustrated in FIG. 1, during operation, the workpiece 170 is placed along the optical axis OA, and may be mounted on a translation stage 175 which may be advantageously aligned such that it translates along the Z axis direction constrained by guide bearings 175A. In various implementations, the translation stage 175 may also or alternatively be translatable along the X and/or Y axis directions. In general, in various implementations the workpiece 170 and/or the optical element 120 may be movable and/or otherwise translatable relative to one another along one or more of the X, Y and Z axes for obtaining different measurements (e.g., at different surface locations) of the workpiece 170. It will be appreciated that in various implementations, the utilization of a fiber optic cable segment or similar arrangement (e.g., such as the fiber optic cable segment 112 of FIG. 1) may enable the optical element 120 and/or similar components to be movable relative to certain other components of the CRS system 100 (e.g., including components of the electronics portion 160, such as the wavelength detector 162 and/or light source 164) while still enabling the system to perform measurement operations as described above (e.g., for measuring a surface of the workpiece 170). It will be appreciated that in various implementations, the systems illustrated herein may be rotated or otherwise oriented so that the optical axis OA and Z axis direction may be oriented along a vertical, horizontal or other direction or angle, and for which the corresponding distance/height measurements (e.g., for a workpiece surface) will be understood to be similarly oriented along such direction or angle as corresponding to the optical axis OA and Z axis direction of the system.

Certain known background signal processing and/or calibration operations for CRS systems such as that of FIG. 1 are described in the previously incorporated '347 patent. Certain signal processing operations that determine distance-indicating coordinates (DIC) with subpixel resolution based on a wavelength peak produced in a wavelength-dispersed intensity profile from a CRS (e.g., from a wavelength detector 162, with wavelength peaks such as those illustrated in FIGS. 9A-9C), and determine a measurement distance to a workpiece surface (e.g., in microns) based on the determined DIC, are described in more detail in the previously incorporated '347 and '456 patents. Briefly, CRS measurement distance calibration data may be determined which correlates distance-indicating coordinates (DIC) with sub-pixel resolution to known measurement distances (ZOUT) in microns along the optical axis OA of the CRS system. In various implementations, a measurement DIC calculated by the CRS system may be referenced to a stored calibration lookup table and/or other stored calibration data in order to determine the corresponding measurement distance (in microns). If the measurement DIC falls between adjacent calibration DIC values, then the measurement distance may be determined by interpolation.

Figure 2A:
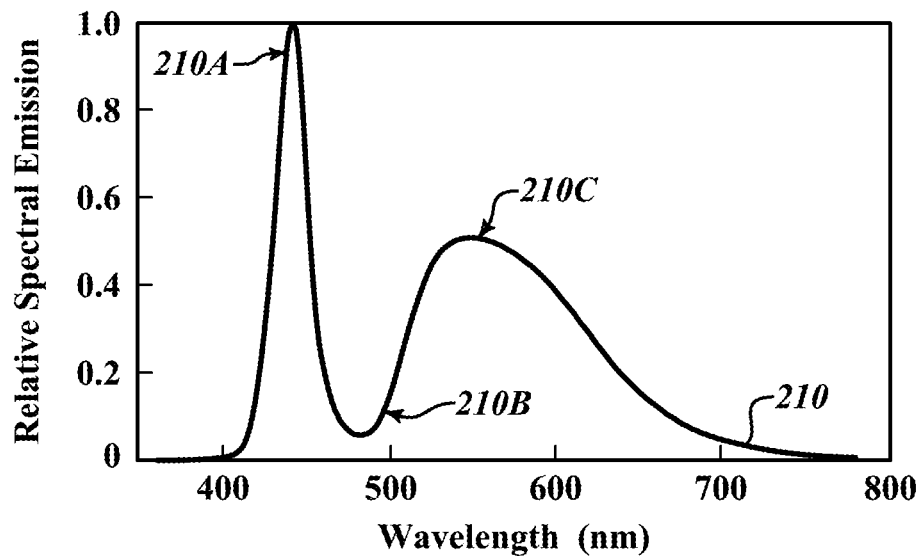
FIGS. 2A-2C are diagrams of emission spectra for phosphor compositions as may be utilized in CRS source light configurations.
Figure 2B:
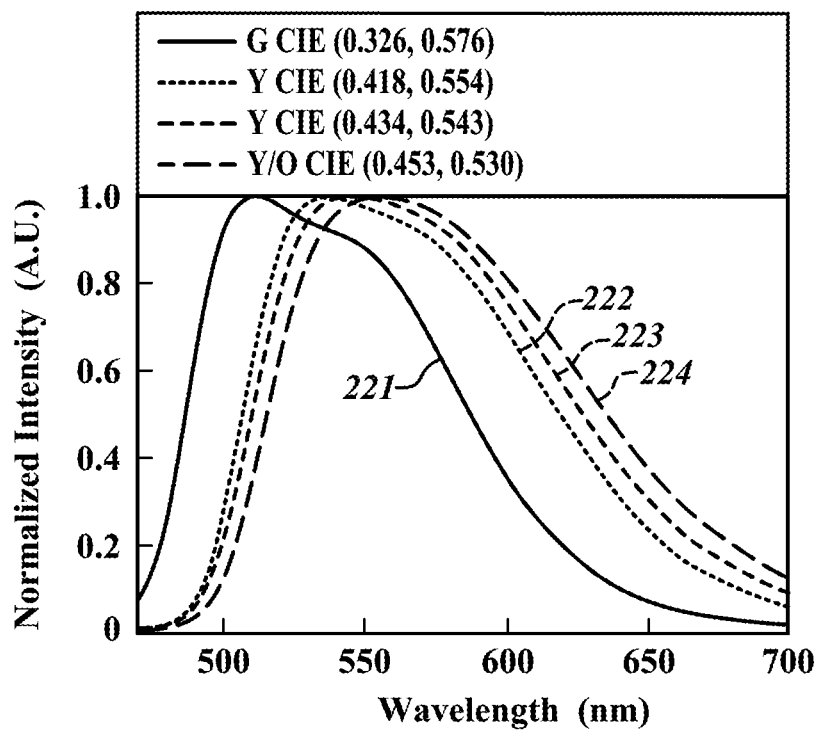
Figure 2C:
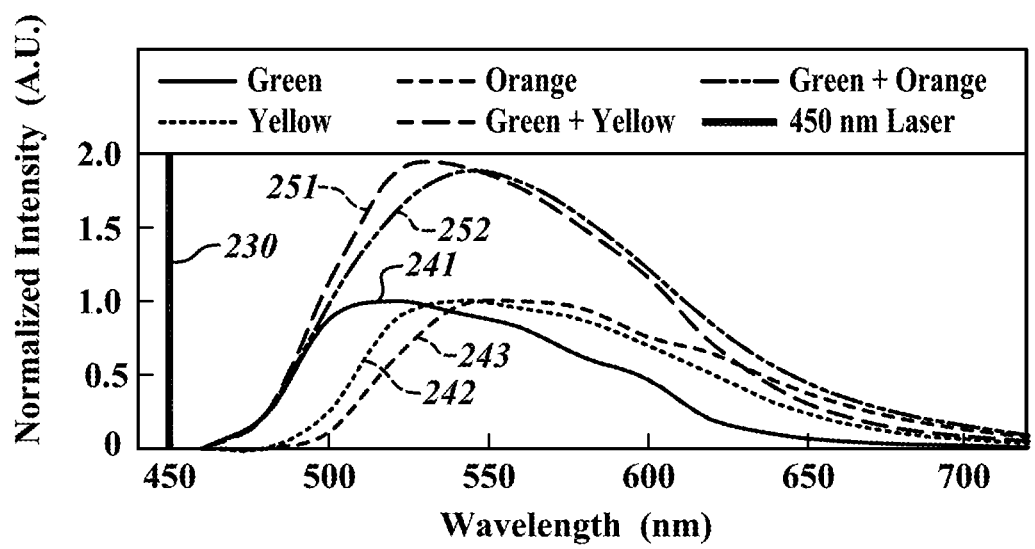

FIGS. 2A-2C are diagrams of emission spectra for phosphor compositions as may be utilized in a source light configuration in a CRS system (e.g., such as in light source 164 of FIG. 1 and/or other CRS light sources as described herein). As will be described in more detail below, FIG. 2A illustrates an emission spectrum for a previously known LED pumped phosphor, FIG. 2B illustrates emission spectra for phosphors having differing characteristics, and FIG. 2C illustrates emission spectra for a source light configuration utilizing phosphor compositions (e.g., such as those of FIG. 2B) in different phosphor regions in accordance with principles disclosed herein.

As shown in FIG. 2A, the emission spectrum 210 for the LED pumped phosphor includes a region 210A corresponding to the pump LED, a region 210B corresponding to a wavelength gap, and a region 210C corresponding to a phosphor emission. As described above and in the incorporated references, chromatic confocal range systems may encode the height of an object in terms of the wavelength of light transmitted through an aperture (e.g., a single pinhole, or pinhole array, or other aperture or aperture array, etc.). Light sources for such chromatic confocal range systems are typically broadband white light sources (e.g., in order to provide the full necessary range of wavelengths of light in order for the corresponding height encoding techniques to be operable over a desired range). The white light sources used in certain prior systems have included phosphor pumped by an excitation light source (e.g., a 450 nm LED has often been utilized).

As illustrated in FIG. 2A, one issue with such prior chromatic confocal range systems utilizing a phosphor pumped by a 450 nm LED is the resulting wavelength gap. As noted above, in FIG. 2A the wavelength gap is indicated by the region 210B (e.g., centered at 480 nm, which may in some instances be referenced as a "green hole" as per the 480 nm wavelength), as exists between the pump light source region 210A and the emitting wavelength of the phosphor region 210C. As will be described in more detail below, in accordance with principles disclosed herein, a configuration is provided which enables the wavelength range of a light source to be extended into what would otherwise be a wavelength gap region (e.g., the region 210B of FIG. 2A). By utilizing the disclosed techniques to extend the wavelength range of the light source, the measurement range of the CRS system may in some implementations be substantially improved. For example, in an implementation where the glasses used in the chromatic lenses of the CRS system have high dispersion at the wavelengths of the wavelength gap (e.g., at the green wavelengths illustrated in the example of FIG. 2A), by extending the wavelengths of the light source into this region, the CRS measurement range may be increased by a relatively significant amount (e.g., increased by up to 30%, etc.). In various implementations, in addition to such techniques for extending the wavelength range, a configuration in accordance with principles disclosed herein may also include other advantageous aspects (e.g., utilizing certain types of phosphors and a narrowband laser source as the excitation light source to pump the phosphors, as may help address certain other issues, as will be described in more detail below with respect to FIGS. 3A and 3B).

FIG. 2B illustrates emission spectra for phosphors (e.g., ceramic phosphors) that have differing characteristics. For example, the emission spectrum 221 is for a phosphor with CIE coordinates represented as G CIE (0.326, 0.576), and is illustrated as having a peak in a green wavelength range. The emission spectra 222, 223 and 224 are for phosphors having CIE coordinates represented as Y CIE (0.418, 0.554), Y CIE (0.434, 0.543) and Y/O CIE (0.453, 0.530), respectively, and are illustrated as having peaks generally in the yellow, orange, etc., wavelength ranges. With respect to the wavelength gap region 210B illustrated in FIG. 2A, it will be appreciated that in various implementations the emission spectrum 221 (with the peak in the green wavelength range) may be utilized to help fill the wavelength gap, but that certain higher wavelengths (e.g., of one or more of the emission spectra 222-224) may also be desirable as part of the output of a source light configuration (e.g., to provide a desirable overall range including the higher wavelengths for the CRS system, etc.) With respect to possibilities for combining the characteristics of certain phosphors (e.g., such as those illustrated in FIG. 2B), it has been experimentally determined that certain configurations for combining the phosphors may be relatively less effective. For example, when certain crystal phosphors have been combined monolithically, in various implementations the resulting emission spectra have not shown a substantial increase in the wavelength range. This may in some instances be due to reabsorption of certain wavelengths by the different phosphors. As a specific example, as compared to an emission spectrum for standard YAG:Ce (yittrium aluminum garnet doped with cerium), an LED pumping a sandwich configuration including LuYAG:Ce (luttetium aluminium garnet doped with cerium) and YGdaG:Ce has been observed to produce an emission spectrum that is somewhat shifted (i.e., toward the blue wavelengths), but for which the overall wavelength range does not appear to have been substantially increased (i.e., the curve appears to have been shifted but not widened). More specifically, the emission spectrum for such a configuration appears to have a greater emission in the blue wavelengths at the expense of the red wavelengths (i.e., for which the curve is generally shifted toward the blue wavelengths but is not generally broadened as compared to the emission spectrum for the standard YAG:Ce).

In contrast to such monolithic or other combinations (e.g., sandwiched or mixed or otherwise combined configurations of the phosphors), in accordance with principles disclosed herein, a configuration is provided that has been determined to result in an increase in the overall wavelength range of a source light configuration (e.g., as may be utilized for certain CRS measurement operations). As will be described in more detail below with respect to FIGS. 3A and 3B, a source light configuration is provided in which first and second phosphor compositions are located in separate first and second phosphor regions (e.g., as pumped by an excitation light source including at least one high power laser, such as a 450 nm laser, or a 405 nm laser, or the like). A wavelength combining configuration may operate (e.g., including a beamsplitter) to both split the excitation light to be directed to the first and second phosphor compositions, and to output/direct at least some of the resulting first and second emitted light from the first and second phosphor compositions along a shared source light path. Some example emission spectra that result from such a configuration are illustrated in FIG. 2C.

Figure 3A:
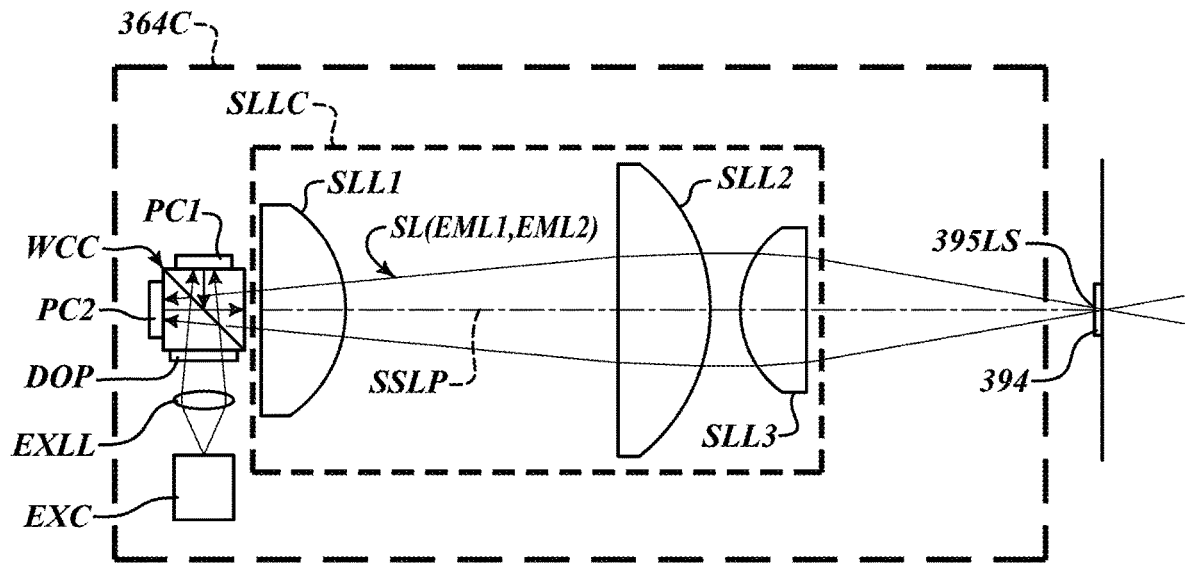
FIGS. 3A and 3B are diagrams of a source light configuration including first and second phosphor compositions located in first and second phosphor regions, respectively, in accordance with principles disclosed herein.
Figure 3B:
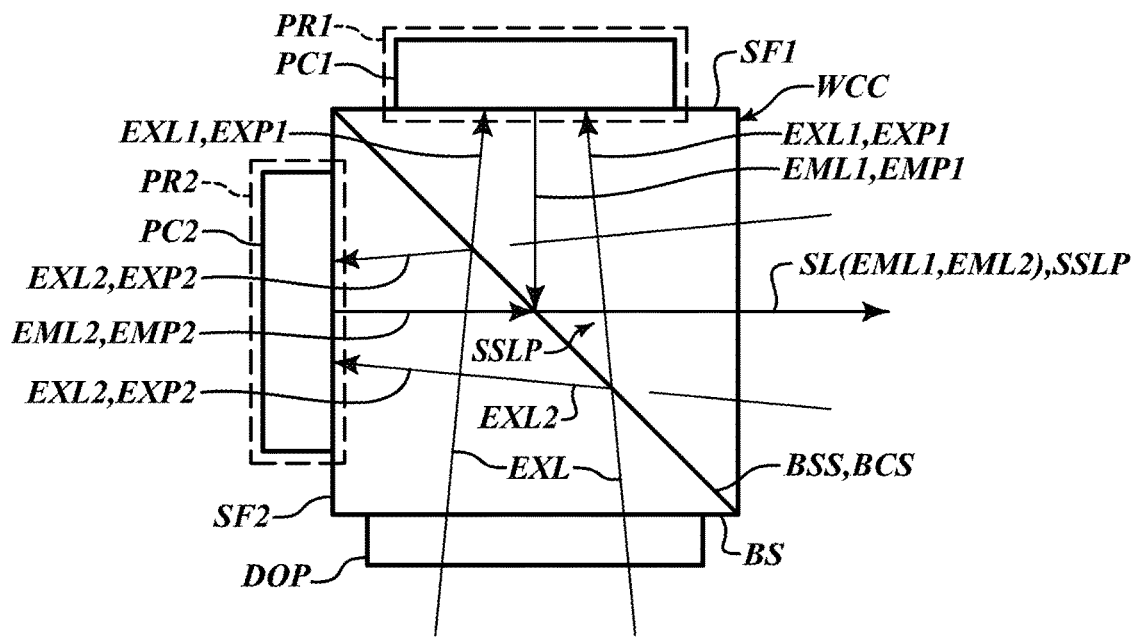

As shown in FIG. 2C, an emission spectrum 251 corresponds to a configuration in which the first and second phosphor compositions in FIGS. 3A and 3B are designated as corresponding to green and yellow phosphors. As also shown, an emission spectrum 252 corresponds to a configuration in which the first and second phosphor compositions in FIGS. 3A and 3B are designated as corresponding to green and orange phosphors. For comparison, emission spectra 241, 242 and 243 are also illustrated, as corresponding to individual phosphor compositions designated as green, yellow and orange phosphors, respectively. The emission spectra 251 or 252 illustrate the increase in the wavelength range of the source light configuration (i.e., for which the emission spectra 251 and 252 appear to include the green wavelengths of the emission spectrum 241, as well as the higher wavelengths of the emission spectra 242 or 243). In effect, through utilization of a configuration such as that of FIGS. 3A and 3B, the emission spectra of the green and of one of the other phosphors have been added linearly to produce a wider band emission indicated by the resulting emission spectra 251 and 252. In the illustration of FIG. 2C, the excitation light source corresponds to a 450 nm laser (with a corresponding output at 450 nm with an amplitude that extends above the scale).

FIGS. 3A and 3B are diagrams of various aspects of a source light configuration 364C including first and second phosphor compositions PC1 and PC2 located in first and second phosphor regions PR1 and PR2, respectively, in accordance with principles disclosed herein. It will be appreciated that certain numbered components of FIGS. 3A and 3B (e.g., 3XX, etc.) may correspond to and/or have similar operations as identically or similarly numbered counterpart components of FIG. 1 (e.g., 1XX, etc.) and may be understood by analogy thereto and/or as otherwise described below. This numbering scheme to indicate elements having analogous design and/or function is also applied to following FIGS. 4-8. As shown in FIG. 3A, the source light configuration 364C includes an excitation light configuration EXC, a first phosphor composition PC1, a second phosphor composition PC2, a wavelength combining configuration WCC, and a shared source light path SSLP. In various implementations, the excitation light configuration EXC may include one or more excitation light sources (e.g., one or more lasers, LEDs, etc.) that produce excitation light.

As will be described in more detail below with respect to FIG. 3B, in operation the excitation light configuration EXC outputs excitation light EXL which is directed to the first and second phosphor compositions PC1 and PC2, in response to which the first and second phosphor compositions PC1 and PC2 produce emitted light EML1 and EML2, respectively. The wavelength combining configuration WCC is configured to output at least some of the emitted light EML1 and EML2 from the first and second phosphor compositions PC1 and PC2 along the shared source light path SSLP as the source light SL that is received by each of the one or more respective confocal light source apertures 395LS. In various implementations, the configuration may include only one confocal light source aperture 395LS (e.g., such as in the implementation of FIG. 1). In implementations where there are multiple measurement channels with multiple confocal light source apertures 395LS (e.g., see FIGS. 4-6), the multiple confocal light source apertures 395LS may be included as part of an aperture array or similar component or structure. In various implementations, a component or structure 394 may include the single or multiple confocal light source apertures 395LS, and may also include one or more corresponding micro lenses or other elements (e.g., similar to the configuration of FIG. 4, as will be described in more detail below).

As illustrated in FIG. 3A, the shared source light path SSLP includes a source light lens configuration SLLC that focuses at least part of the source light SL proximate to each of the one or more respective confocal light source apertures 395LS. In various implementations, the source light SL at the aperture(s) 395LS may be shaped by the source light lens configuration SLLC to be a single spot or point (e.g., for a single light source aperture 395LS), or to be a line (e.g., for a linear array of light source apertures 395LS), etc. In the example of FIG. 3A, the source light lens configuration includes lenses SLL1, SLL2 and SLL3. In various implementations, the lens SLL1 may be a condensing lens, the lens SLL2 may be a field lens, and the lens SLL3 may be a cylinder lens. In various implementations, an aperture stop (not shown) may be included between the lenses SLL1 and SLL2 or at another location along the shared source light path SSLP. In various implementations, the lens SLL3 (e.g., a cylinder lens) may focus the source light SL as a line proximate to a linear array or other configuration of confocal light source apertures 395LS (e.g., for which the line is perpendicular to the view of FIG. 3A).

In various implementations, a lens EXLL (e.g., a collimating lens) and/or a diffractive optic DOP may be included between the excitation light configuration EXC and the wavelength combining configuration WCC. In various implementations, the lens EXLL may be configured to collimate the excitation light EXL from the excitation light configuration EXC. In various implementations, the diffractive optic DOP (optional) may be configured to produce a narrow line of the excitation light EXL, which may result in the first and second emitted light EML1 and EML2 also being produced as a narrow line (e.g., which may in some implementations be received by a correspondingly oriented linear configuration of confocal light source apertures 495LS, etc., with a relatively high degree of efficiency between the light that is emitted and the light that is received by the apertures). As noted above, a lens SLL3 of the source light lens configuration SLLC may also or alternatively be utilized for focusing or further focusing the source light SL (including the first and second emitted light EML1 and EML2) as a line for being received by a linear configuration of confocal light source apertures 395LS.

FIG. 3B is an enlarged view of a portion of the source light configuration 364C including the wavelength combining configuration WCC, the first phosphor composition PC1, the second phosphor composition PC2, and the beginning of the shared source light path SSLP. As illustrated in FIG. 3B, the first phosphor composition PC1 is located in a first phosphor region PR1 and the second phosphor composition PC2 is located in a second phosphor region PR2 that is separate from the first phosphor region PR1. In operation, the excitation light configuration EXC outputs the excitation light EXL to the first phosphor region PR1 and the second phosphor region PR2, respectively. In response to the excitation light EXL, the first and second phosphor compositions PC1 and PC2 emit first and second emitted light EML1 and EML2, respectively, to the wavelength combining configuration WCC which is configured to output at least some of the first emitted light EML1 and second emitted light EML2 along the shared source light path SSLP as the source light SL that is received by each respective confocal light source aperture 395LS. As will be described in more detail below, the first emitted light EML1 and the second emitted light EML2 have different first and second peak wavelengths, respectively.

In various implementations, the excitation light EXL comprises first excitation light EXL1 that is provided along a first excitation light path EXP1 to the first phosphor region PR1 and second excitation light EXL2 that is provided along a second excitation light path EXP2 to the second phosphor region PR2. The source light configuration 364C includes a beam splitting surface BSS (e.g., as part of a beamsplitter BS) that splits at least some of the excitation light EXL into the first excitation light EXL1 and the second excitation light EXL2. The first phosphor composition PC1 in the first phosphor region PR1 is fixedly arranged relative to a first surface SF1 of the beamsplitter BS so as to receive the first excitation light EXL1, and the second phosphor composition PC2 in the second phosphor region PR2 is fixedly arranged relative to a second surface SF2 of the beamsplitter BS so as to receive the second excitation light EXL2.

In various implementations, the first phosphor composition PC1 in the first phosphor region PR1 may be coupled to (e.g., attached or otherwise fixed to) the first surface SF1 of the beamsplitter BS and the second phosphor composition PC2 in the second phosphor region PR2 may be coupled to (e.g., attached or otherwise fixed to) the second surface SF2 of the beamsplitter BS. In various alternative implementations, the first and second phosphor compositions PC1 and PC2 may be formed as separate elements that may have a separation from and/or otherwise not be attached to the surfaces SF1 and SF2 (e.g., but may be disposed in fixed positions relative to the surfaces SF1 and SF2 and/or other components of the wavelength combining configuration WCC). In various implementations, the first and second phosphor compositions PC1 and PC2 may each be formed as wafers or other solid independent elements (e.g., as may be attached or separate from the surfaces SF1 and SF2). In various implementations, the first and second surfaces SF1 and SF2 and/or the first and second phosphor compositions PC1 and PC2 may nominally be orthogonal or otherwise at an angle relative to one another, respectively (e.g., for which FIG. 3B illustrates an orthogonal configuration).

In various implementations, the wavelength combining configuration WCC comprises a beam combining surface BCS (e.g., which may be the same surface as the beam splitting surface BSS of the beamsplitter BS) and which directs at least some of the first emitted light EML1 and/or the second emitted light EML2 along the shared source light path SSLP. For example, as illustrated in FIG. 3B, the beam combining surface BCS reflects at least some of the first emitted light EML1 to be directed along the shared source light path SSLP (i.e., along with at least some of the second emitted light EML2 which is transmitted through the beam combining surface BCS to continue along the shared source light path SSLP). In various implementations, the beamsplitter BS may have an approximate splitting efficiency of 50% for the excitation light EXL and/or the emitted light.

In various implementations, the first phosphor composition PC1 in the first phosphor region PR1 may comprise a first sintered phosphor composition and the second phosphor composition PC2 in the second phosphor region PR2 may comprise a second sintered phosphor composition. In various implementations, the first phosphor composition PC1 in the first phosphor region PR1 may comprise a first ceramic phosphor and the second phosphor composition PC2 in the second phosphor region PR2 may comprise a second ceramic phosphor. In various implementations, the utilization of ceramic single crystal phosphors (e.g., including high power ceramic phosphor mounted to a heat sink) may have the advantage of much higher thermal conductivity which may result in a much higher quenching threshold. For example, in an implementation where the excitation light configuration EXC comprises a laser which produces a power level of 1.6 $W/mm^2$, such may be well below a quenching point of such phosphors (e.g., with a quenching point in one specific example configuration of 15 $W/mm^2$). As noted above, such configurations may result in a bright white light source with an overall broad wavelength range.

In various implementations, the first phosphor composition PC1 may primarily comprise a first phosphor that emits light with a first peak wavelength in a first range of wavelengths and the second phosphor composition PC2 may primarily comprise a second phosphor that emits light with a second peak wavelength in a second range of wavelengths that is different than the first range of wavelengths, and for which the second peak wavelength is different than the first peak wavelength. In various implementations, the first and second ranges of wavelengths may be distinct or may partially overlap.

In various implementations, the first and second peak wavelengths are each in a wavelength range between 435 nm and 600 nm. In various implementations, the first range of wavelengths may include wavelengths between 435 nm and 565 nm. In various implementations, such wavelengths may indicate that the first emitted light EML1 corresponds to at least one of blue, cyan or green emitted light. In various implementations, the first emitted light EML1 has a first peak wavelength and the second emitted light EML2 has a second peak wavelength that are at least a minimum difference from one another (e.g., at least 10 nm different, at least 20 nm different, etc.). For example, in one implementation the first emitted light EML1 may have a peak wavelength of 510 nm and an emission centroid of 545 nm (e.g., corresponding to green emitted light) and the second emitted light EML2 may have a peak wavelength of 535 nm and an emission centroid of 573 nm (e.g., corresponding to yellow emitted light), for which the difference between the peak wavelengths is approximately 25 nm. It will be appreciated that in accordance with principles disclosed herein, a greater separation between the peak wavelengths, up to certain limits, may correspond to a relatively broader overall wavelength range for the source light configuration (e.g., in accordance with the approximate addition of the first emitted light EML1 to the second emitted light EML2 in certain implementations).

In various implementations, the excitation light configuration EXC may include one or more excitation light sources which may include one or more lasers. In some implementations, the excitation light configuration EXC may include only a single laser, or may include multiple (e.g., two or more) lasers. In various implementations, the laser(s) may output excitation light in a wavelength range that includes wavelengths between 400 nm and 485 nm. In various implementations, the laser may output excitation light in a narrow range generally at a specific wavelength (e.g., a 450 nm laser, or a 405 nm laser, as may correspond to blue or violet excitation light, etc.). In one specific example implementation, a single 450 nm laser may be utilized which produces a power level of 1.6 W/mm$^2$, or two 450 nm lasers may be utilized which produce a combined power level of 3.2 W/mm$^2$.

In various implementations, utilization of one or more lasers as the excitation light configuration EXC (e.g., in addition to utilizing certain types of phosphors for the phosphor compositions PC1 and PC2) may help address certain issues. More specifically, in certain previous CRS systems utilizing LED pumped phosphor source light configurations (e.g., as illustrated in FIG. 2A), one issue has been that the LED pumped powdered phosphor sources are sometimes not bright enough for certain CRS applications. Another issue encountered with such LED pumped white light sources in certain CRS applications is that the broadband LED wavelength may sometimes drift over time (e.g., due to injection current, duty cycle, temperature, etc.). In configurations where the LED pump source bandwidth partially overlaps the phosphor wavelengths, the drift of the broadband LED wavelength may change the spectral content of the light source (e.g., at wavelengths below 520 nm) and ultimately lead to CRS position errors. More specifically, such changes may cause measurements for a same surface height to be different at different times, as may correspond to CRS position errors.

In accordance with principles disclosed herein, at least some of these issues may be at least partially addressed by utilizing a configuration with a narrowband laser source (e.g., at 450 nm) as the excitation light configuration EXC to pump the phosphor compositions PC1 and PC2. In various implementations, the utilization of a laser for the excitation light configuration EXC may have the added advantage of a higher brightness so as to produce a source light configuration 364C with a higher output power. In addition the excitation light configuration EXC can be designed so that it has a smaller spot size that reduces the etendue of the source. Thus, light can be more efficiently coupled through the confocal apertures (e.g., pinhole apertures) of the CRS system.

Figure 4:
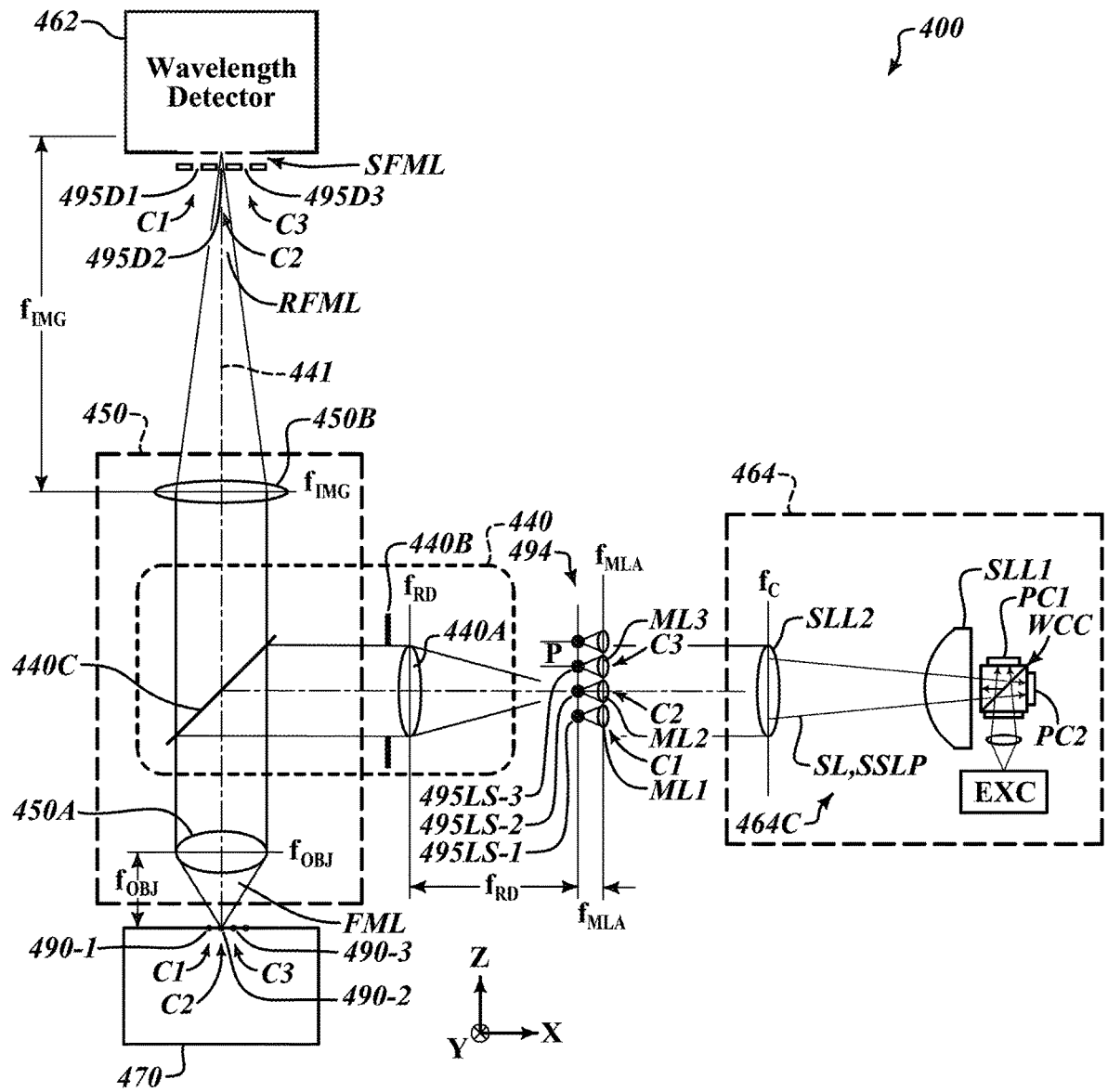
FIG. 4 is a diagram of a second exemplary implementation of a CRS system including a source light configuration similar to that of FIGS. 3A and 3B.

FIG. 4 is a diagram of a second exemplary implementation of a CRS system 400 including a source light configuration similar to that of FIGS. 3A and 3B. As shown in FIG. 4, the CRS system 400 includes a wavelength detector 462, a source light configuration 464C (e.g., as part of a light source 464), and a plurality of measurement channels (e.g., for which certain representative measurement channels C1, C2 and C3 will be described in more detail below). Each measurement channel is configured to sense a respective distance to a workpiece surface location 490 of a workpiece 470 (e.g., similar to the operations of FIG. 1 as described above) and includes a respective confocal detection aperture 495D and a respective confocal light source aperture 495LS. For example, in the implementation of FIG. 4, each of the representative measurement channels C1, C2 and C3 includes a respective confocal detection aperture 495D1, 495D2 and 495D3 (e.g., as part of an aperture array), and a respective confocal light source aperture 495LS-1, 495LS-2 and 495LS-3 (e.g., as part of an aperture array), and is configured to sense a respective distance to a workpiece surface location 490-1, 490-2 and 490-3. In the example of FIG. 4, the workpiece surface locations 490-1, 490-2 and 490-3 are generally illustrated as being at similar heights. An example of a workpiece with workpiece surface locations at different heights will be described in more detail below with respect to FIG. 7.

In the example implementation of FIG. 4, each respective confocal detection aperture 495D is configured to receive reflected focused measurement light RFML from the respective workpiece surface location 490 along a measurement optical path 441 and transmit spatially filtered measurement light SFML to the wavelength detector 462. Each respective confocal light source aperture 495LS is configured to receive source light SL (i.e., as provided along the shared source light path SSLP) from the source light configuration 464C and to transmit at least a portion of the source light SL along an input path 440 to a measurement path lens configuration 450. In various implementations, the input path 440 may include an input lens 440A, an aperture stop 440B and a reflective surface 440C (e.g., a half or dichroic mirror). The source light SL (i.e., including first and second emitted light) that passes through each of the respective confocal light source apertures (e.g., including 495LS-1, 495LS-2 and 495LS-3) may pass through the lens 440A and be filtered by the aperture stop 440B, and may be reflected by the surface 440C for being received by the measurement path lens configuration 450.

The measurement path lens configuration 450 is configured to input the source light SL from each respective confocal light source aperture 495LS (e.g., as reflected by the surface 440C) and to output (e.g., from a lens 450A which may include an objective lens) focused measurement light FML with axial chromatic dispersion to the respective workpiece surface location 490 and to receive reflected focused measurement light RFML from the respective workpiece surface location 490 and focus (e.g., utilizing a lens 450B) the reflected focused measurement light RFML proximate to each respective confocal detection aperture 495D. As noted above, each respective confocal detection aperture 495D is configured to receive the reflected focused measurement light RFML along the measurement optical path 441 and transmit spatially filtered measurement light SFML to the wavelength detector 462. In various implementations, the term confocal may denote in certain instances a spatial filtering aperture (e.g., the respective confocal detection aperture 495D) that primarily accepts light originating at a conjugate point or conjugate focal plane (e.g., at the respective confocal light source aperture 495LS), and for which the term conjugate may indicate that points at one conjugate location are focused at the other conjugate location (e.g., with the respective confocal detection aperture 495D and respective confocal light source aperture 495LS each being at respective conjugate locations). In various implementations, for each measurement channel, the respective confocal light source aperture 495LS may be nominally confocal to the respective confocal detection aperture 495D.

FIG. 4 includes orthogonal XYZ coordinate axes (e.g., similar to FIG. 1), as a frame of reference (e.g., including with respect to the measurements of the workpiece 470). The Z direction is defined to be parallel to an optical axis, which is the distance/height measuring axis (e.g., of the lens 450A as part of the measurement path lens configuration 450). As illustrated in FIG. 4 (e.g., and as will be described in more detail below with respect to FIGS. 7-9), during operation, the workpiece 470 may be placed along the optical axis (e.g., and may be mounted on a translation stage (not shown) similar to that of FIG. 1 and/or for which the workpiece 470 and/or at least a portion or all of the CRS system 400 may be movable and/or otherwise translatable relative to one another along one or more of the X, Y and Z axes for obtaining different measurements of the workpiece 470). It will be appreciated that in various implementations, the systems illustrated herein may be rotated or otherwise oriented so that the optical axis and corresponding Z axis direction may be oriented along a vertical, horizontal or other direction or angle, and for which the corresponding distance/height measurements (e.g., for a workpiece surface) will be understood to be similarly oriented along such direction or angle as corresponding to the optical axis and Z axis direction of the system (e.g., for measuring the workpiece 470).

In the implementation of FIG. 4, each measurement channel includes a respective lens (e.g., a micro lens) located along the shared source light path SSLP between the wavelength combining configuration WCC and the respective confocal light source aperture 495LS of the measurement channel. For example, each of the representative measurement channels C1, C2 and C3 includes a respective micro lens ML-1, ML2 and ML-3. Each respective micro lens ML-1, ML-2 and ML-3 is configured to focus at least part of the first and second emitted light EML1 and EML2 along the shared source light path SSLP as source light SL that is focused proximate to the respective confocal light source aperture 495LS-1, 495LS-2 and 495LS-3. In various implementations, a component 494 may include an aperture array (e.g., including the confocal light source apertures 495LS-1, 495LS-2 and 495LS-3). In various implementations, the micro lenses may be included as part of a micro lens array (e.g., which may in some implementations also be included as part of the component 494).

The source light configuration 464C of the light source 464 operates similarly to the source light configuration 364C of FIGS. 3A and 3B. More specifically, in the source light configuration 464C, the excitation light configuration EXC outputs the excitation light which is directed to the first and second phosphor compositions PC1 and PC2 (i.e., as located in respective first and second phosphor regions), in response to which the first and second phosphor compositions PC1 and PC2 produce emitted light. The wavelength combining configuration WCC outputs at least some of the emitted light from the first and second phosphor compositions PC1 and PC2 along the shared source light path SSLP as the source light SL.

In various implementations, the shared source light path SSLP may include a source light lens configuration that focuses at least part of the source light SL proximate to each of the one or more respective confocal light source apertures 495LS. In the example of FIG. 4, the source light lens configuration includes lenses SLL1 and SLL2, and may in some implementations include the micro lenses (e.g., ML1, ML2, ML3, etc.). In various implementations, the lens SLL1 may be a condensing lens and the lens SLL2 may be a field/collimating lens. In various implementations, the lens SLL1 may operate to condense the first and second emitted light EML1 and EML2 and the lens SLL2 may operate to collimate the first and second emitted light EML1 and EML2 along the shared source light path SSLP as source light SL that is received by the micro lenses (e.g., ML1, ML2, ML3, etc.). As noted above, each respective micro lens (e.g., ML-1, ML-2 and ML-3) is configured to focus at least part of the first and second emitted light EML1 and EML2 along the shared source light path SSLP as source light SL that is focused proximate to the respective confocal light source aperture (e.g., 495LS-1, 495LS-2 and 495LS-3).

Figure 5:
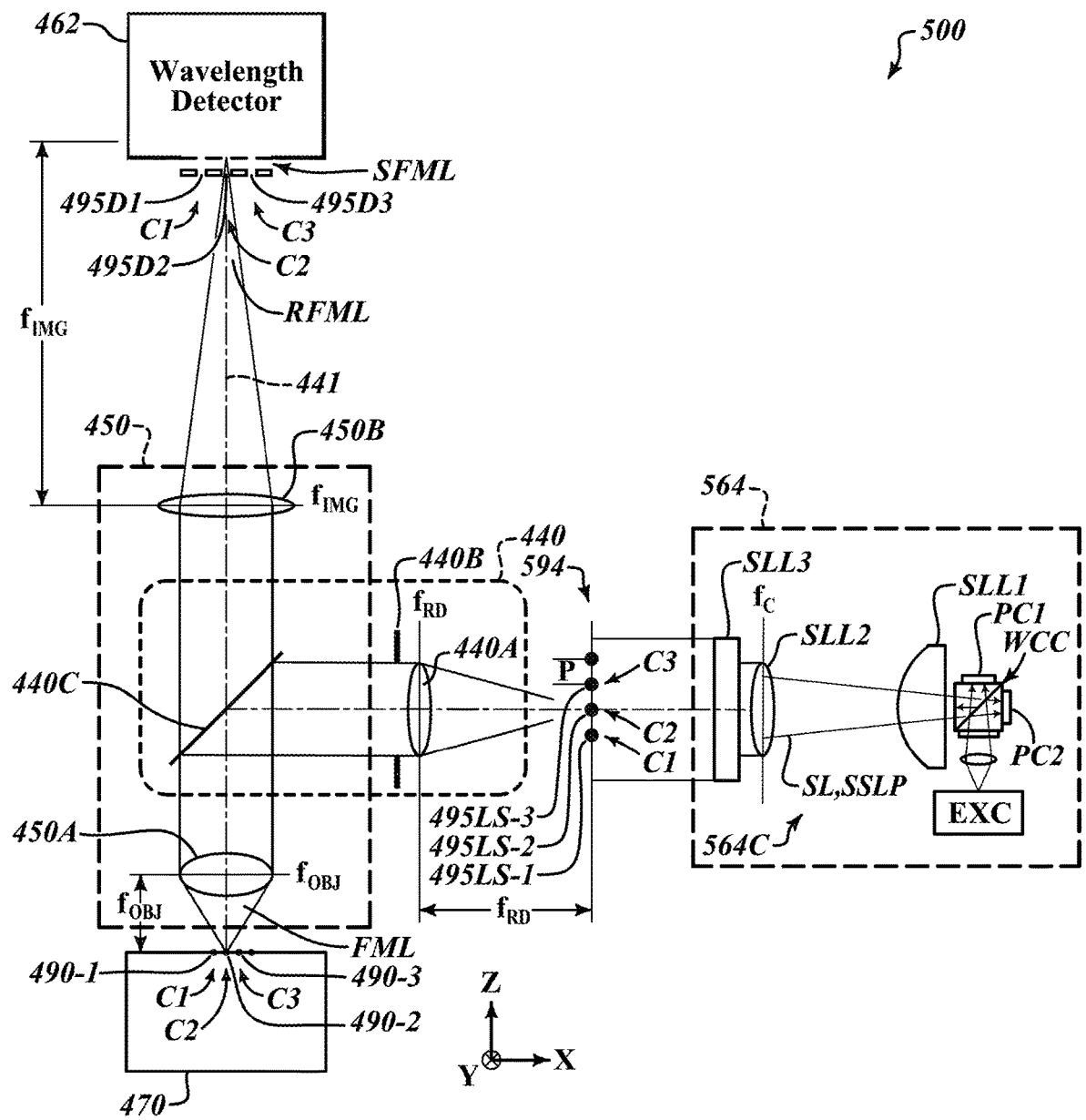
FIG. 5 is a diagram of a third exemplary implementation of a CRS system including a source light configuration similar to that of FIGS. 3A and 3B.

FIG. 5 is a diagram of a third exemplary implementation of a CRS system 500 including a source light configuration similar to that of FIGS. 3A and 3B. The CRS system 500 is similar to the CRS system 400 of FIG. 4 in many respects. As noted above, similarly or identically numbered elements may be understood to be similar or identical and/or to provide similar or identical functions, except as otherwise indicated below. Therefore, only significant differences between the CRS system 500 and the CRS system 400 will be described in more detail below.

One primary difference from the CRS system 400 of FIG. 4, is that the CRS system 500 of FIG. 5 does not include an array of micro lenses and for which the source light configuration 564C of the light source 564 may alternatively include a lens SLL3 (e.g., as part of a source light lens configuration). In various implementations, the lens SLL3 may be a cylindrical lens. As illustrated, the respective confocal light source apertures (e.g., including 495LS-1, 495LS-2 and 495LS-3) may be arranged in a linear configuration for which the cylindrical lens SLL3 is configured to focus at least part of the first and second emitted light EML1 and EML2 along the shared source light path SSLP as source light SL that is focused (e.g., as a line) proximate to the linear configuration of the confocal light source apertures (e.g., including 495LS-1, 495LS-2 and 495LS-3). In various implementations, a component 594 may include an aperture array (e.g., including the linear configuration of the confocal light source apertures 495LS-1, 495LS-2 and 495LS-3). In various implementations, the operations of the CRS system 500 of FIG. 5 may otherwise be similar to the operations of the CRS system 400 of FIG. 4, as described above.

Figure 6:
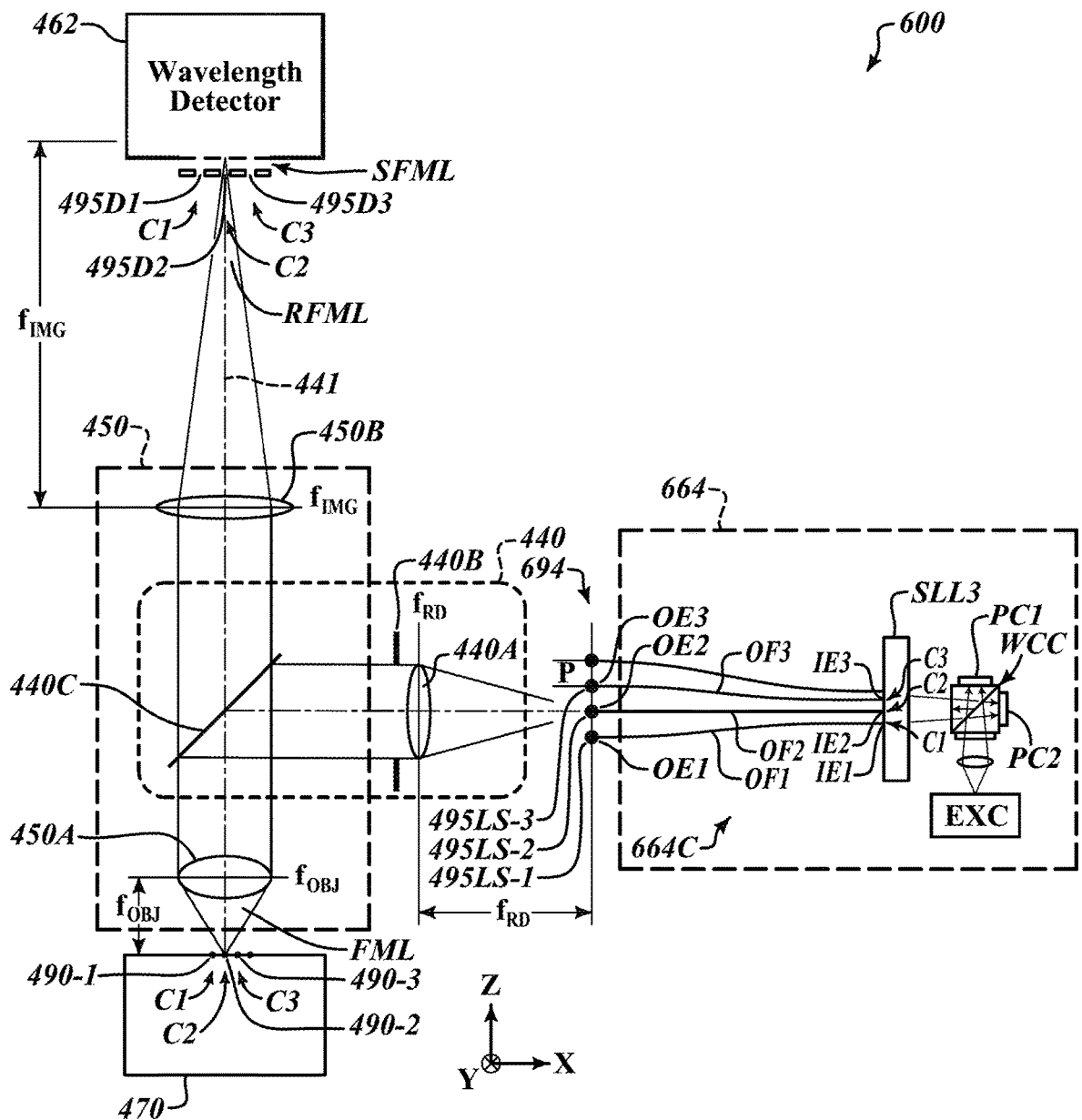
FIG. 6 is a diagram of a fourth exemplary implementation of a CRS system including a source light configuration similar to that of FIGS. 3A and 3B.

FIG. 6 is a diagram of a fourth exemplary implementation of a CRS system 600 including a source light configuration similar to that of FIGS. 3A and 3B. The CRS system 600 is similar to the CRS system 400 of FIG. 4 in many respects. As noted above, similarly or identically numbered elements may be understood to be similar or identical and/or to provide similar or identical functions, except as otherwise indicated below. Therefore, only significant differences between the CRS system 600 and the CRS system 400 will be described in more detail below.

One primary difference from the CRS system 400 of FIG. 4, is that the CRS system 600 of FIG. 6 does not include an array of micro lenses and for which the source light configuration 664C of the light source 664 may alternatively include a plurality of optical fibers OF (e.g., as may be included in respective fiber optic cable segments, etc.). More specifically, in the example implementation of FIG. 6, each measurement channel (e.g., including measurement channels C1, C2, C3, etc.) may include a respective optical fiber (e.g., including optical fibers OF1, OF2, OF3, etc.). Each of the respective optical fibers may have a respective fiber input end (e.g., a respective fiber input end IE1, IE2, IE3, etc.) that is located to input at least some of the first emitted light EML1 and second emitted light EML2 along the shared source light path SSLP from the wavelength combining configuration WCC and transmit that light as the source light SL that is received by a respective confocal light source aperture (e.g., including confocal light source apertures 495LS1, 495LS2, 495LS3, etc.) In addition, the source light configuration 664C of the light source 664 may include a lens SLL3 (e.g., as part of a source light lens configuration). In various implementations, the lens SLL3 may be a cylindrical lens. As illustrated, the respective input ends (e.g., including IE1, IE2 and IE3) of the optical fibers may be arranged in a linear configuration for which the cylindrical lens SLL3 is configured to focus at least part of the first and second emitted light EML1 and EML2 along the shared source light path SSLP as source light SL that is focused (e.g., as a line) proximate to the linear configuration of input ends (e.g., including IE1, IE2 and IE3). In various alternative implementations, a lens SLL3 may not be included (e.g., and for which the input ends of the optical fibers may alternatively be located near or at the surface of the beamsplitter BS for receiving the source light SL directly as it emerges from the beamsplitter BS).

In various implementations, each respective optical fiber may also have a respective fiber output end (e.g., including fiber output ends OE1, OE2, OE3, etc.) which is located to provide the respective confocal light source aperture (e.g., the respective confocal light source aperture 495LS1, 495LS2, 495LS3, etc.) for the respective measurement channel. More specifically, the output end OE of each optical fiber (e.g., as part of a respective fiber optic cable segment) may provide and/or function as an aperture (i.e., a confocal light source aperture 495LS). In various implementations, a component 694 may position, hold and/or otherwise fix the fiber output ends OE1, OE2 and OE3 and/or the confocal light source apertures 495LS-1, 495LS-2 and 495LS-3 (e.g., as an aperture array) relative to each other and/or relative to the rest of the system (e.g., so as to be positioned relative to or otherwise form a linear configuration of the confocal light source apertures 495LS-1, 495LS-2 and 495LS-3). In various implementations, the operations of the CRS system 600 of FIG. 6 may otherwise be similar to the operations of the CRS system 400 of FIG. 4, as described above.

Figure 7:
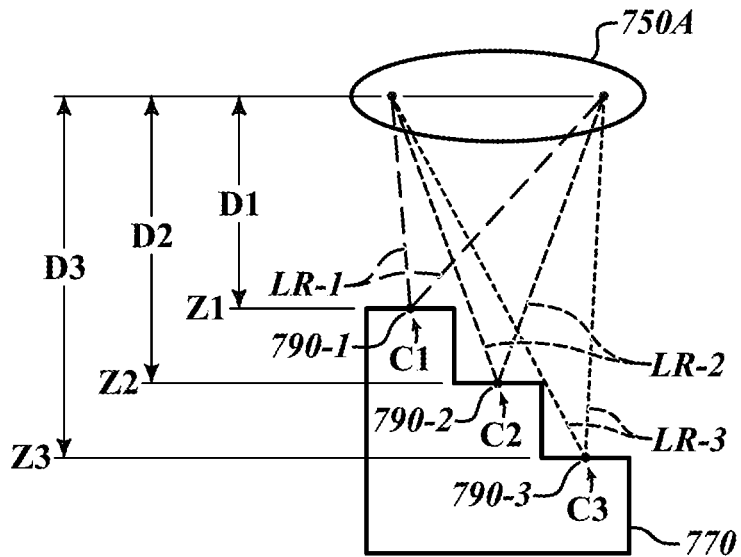
FIG. 7 is a diagram of a workpiece with three surface locations at three different surface heights as measured by three measurement channels of a CRS system.

FIG. 7 is a diagram of a workpiece 770 with three surface locations 790-1, 790-2 and 790-3 at three different surface heights as measured by three measurement channels C1, C2 and C3 of a CRS system. In various implementations, the operations illustrated by the configuration of FIG. 7 may be representative of the operations of the CRS systems 400, 500 and/or 600 utilizing three measurement channels C1, C2 and C3 for measuring a workpiece similar to the workpiece 770, or of other CRS systems (e.g., with similar or other lens configurations) for measuring a similar workpiece with surface locations at different heights. As illustrated in FIG. 7, the workpiece surface locations 790-1, 790-2 and 790-3 are at respective relative heights of Z1, Z2 and Z3, which correspond to respective distances D1, D2 and D3 from a reference position (e.g., as may be relative to an objective lens 750A or other component, such as may be similar to the reference position RP of FIG. 1). In implementations where a CRS system similar or identical to the CRS systems 400, 500 and/or 600 is utilized for performing the measurement operations, the lens 750A may correspond to the lens 450A of the CRS systems 400, 500 and/or 600.

As illustrated in FIG. 7, the first measurement channel C1 may provide focused measurement light as focused at the workpiece surface location 790-1, as indicated by the light rays LR-1, and for which reflected focused measurement light may be focused back through a measurement path lens configuration (e.g., including the lens 750A) and received by a respective confocal detection aperture, as will be described in more detail below with respect to FIG. 8. The second and third measurement channels C2 and C3 may similarly provide focused measurement light as focused at the workpiece surface locations 790-2 and 790-3, respectively, as indicated by the light rays LR-2 and LR-3, and for which reflected focused measurement light may be focused back through a measurement path lens configuration (e.g., including the lens 750A) and received by respective confocal detection apertures.

Figure 8:
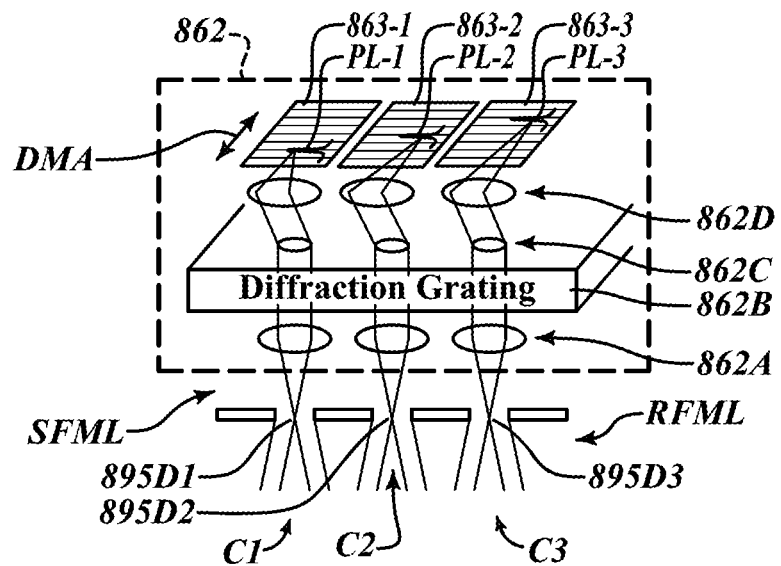
FIG. 8 is a diagram of an exemplary implementation of a wavelength detector configuration of a CRS system illustrating measurement light as received from three measurement channels.

FIG. 8 is a diagram of an exemplary implementation of a wavelength detector configuration 862 of a CRS system illustrating measurement light as received from three measurement channels C1, C2 and C3. In various implementations, the operations illustrated by the wavelength detector configuration 862 of FIG. 8 may be representative of the operations of the wavelength detector configuration 462 of the CRS systems 400, 500 and/or 600, or of wavelength detectors of other CRS systems (e.g., with similar or other lens configurations) for measuring a workpiece (e.g., the workpiece 770 of FIG. 7).

As illustrated in FIG. 8, each of the measurement channels C1, C2 and C3 includes a respective confocal detection aperture 895D1, 895D2 and 895D3. Each respective confocal detection aperture 895D1, 895D2 and 895D3 is configured to receive reflected focused measurement light RFML from a respective workpiece surface location (e.g., workpiece surface locations 790-1, 790-2 and 790-3 of FIG. 7) along a measurement optical path and transmit corresponding spatially filtered measurement light SFML to the wavelength detector 862. As described above and in the incorporated references, in implementations where chromatic confocal techniques are utilized, for each measurement channel only the wavelength that is well-focused on the respective workpiece surface location will be well-focused on the respective confocal detection aperture and will primarily be the wavelength that passes through as the spatially filtered measurement light SFML. For example, for the measurement channel C1, only the wavelength that is well-focused on the surface location 790-1 will be well-focused on the respective confocal detection aperture 895D1, and will primarily pass through as the spatially filtered measurement light SFML (e.g., as indicated by the light rays for the wavelength that is best-focused at and passes through the aperture 895D1, and for which other light rays for other wavelengths that are not well focused at the aperture are indicated as being spatially filtered out, such as by primarily reflecting off the surrounding surfaces of the aperture 895D1). In various implementations, for each of the measurement channels, the CRS system may be configured wherein a respective confocal light source aperture (e.g., of each of the measurement channels C1, C2 and C3) may have an etendue of light emitted that is not substantially greater than (e.g., and in some implementations may be nominally the same as) the etendue of light passing through the respective confocal detection aperture (e.g., the etendue of light passing through the respective confocal detection apertures 895D1, 895D2 and 895D3), so that the light can be more efficiently coupled through the confocal apertures of the CRS system.

In the wavelength detector 862, each of the measurement channels C1, C2 and C3 is shown to have a corresponding set of optical elements and/or locations along an optical path to a respective detector array 863-1, 863-2 and 863-3 (e.g., for which each of the detector arrays may be of a spectrometer). For example, in the implementation of FIG. 8, each of the optical paths may include a lens 862A, at least a portion of a diffraction grating 862, a lens or location 862C, and a lens 862D, for directing light of different wavelengths at different pixel locations on the detector arrays 863-1, 863-2 and 863-3. In operation, the wavelength detector 862 thus receives wavelength-dependent light intensity (i.e., as part of the spatially filtered measurement light SFML that may primarily include the wavelength that is best-focused on the respective workpiece surface location), and through the optical path converts the wavelength-dependent light intensity to an output spectral intensity profile (also referred to simply as an output spectral profile) distributed over an array of pixels along a detector measuring axis DMA of each respective detector array 863-1, 863-2 and 863-3, and operates to provide corresponding output spectral profile data based on pixel data output from each respective detector array 863-1, 863-2 and 863-3. In the example of FIG. 8, the illustrated output spectral intensity profiles on the respective detector arrays 863-1, 863-2 and 863-3 are indicated as primarily being located at pixel positions of PL-1, PL-2 and PL-3, respectively. In various implementations, the detector arrays 863-1, 863-2 and 863-3 may be separate components (e.g., of separate spectrometers), or may each correspond to a different location or area (e.g., each corresponding to a specific set of columns of pixels) on a single detector array (e.g., of a spectrometer), etc.

Figure 9A:
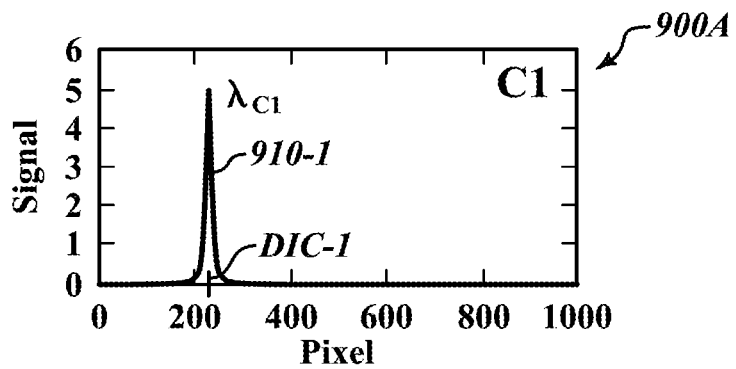
FIGS. 9A-9C are diagrams of spectrometer signals from a wavelength detector configuration such as that of FIG. 8 when measuring surface heights of a workpiece such as that of FIG. 7.
Figure 9B:
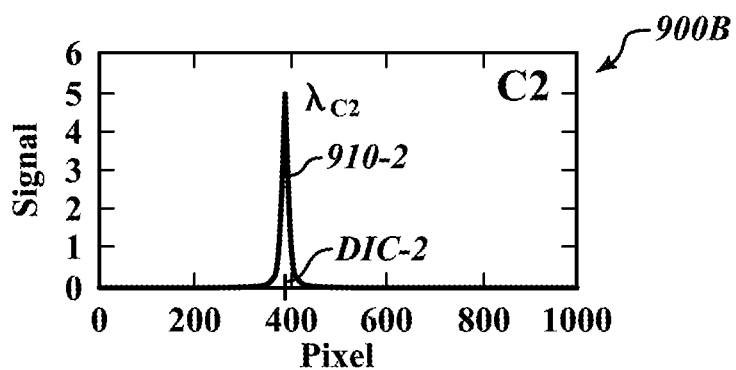
Figure 9C:
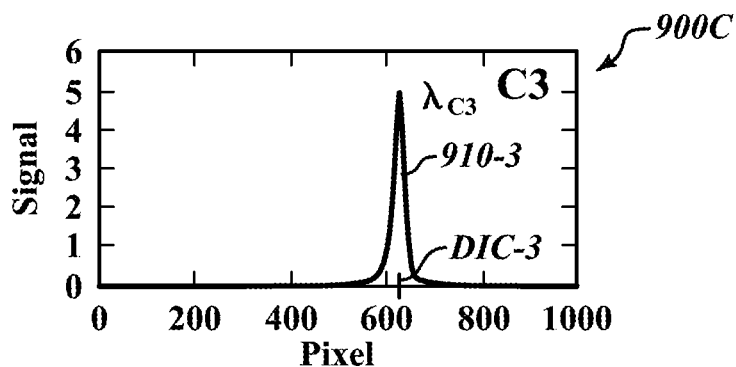

FIGS. 9A-9C are diagrams of graphs 900A-900C of spectrometer signals from a wavelength detector configuration such as that of FIG. 8 when measuring workpiece surface heights such as those of FIG. 7. The graphs 900A, 900B and 900C represent respective output spectral profile data 910-1, 910-2 and 910-3 for the respective channels C1, C2 and C3 and the corresponding respective detector arrays 863-1, 863-2 and 863-3 of FIG. 8. As noted above, in operation output spectral profile data 910 may be provided based on pixel data output from each respective detector array 863-1, 863-2 and 863-3 (i.e., corresponding to the respective graphs 900A, 900B and 900C in FIGS. 9A-9C). In various implementations, a subpixel-resolution distance-indicating coordinate DIC of the profile data may be calculated (e.g., by a signal processor similar to the signal processor 166 of FIG. 1), and the DIC (e.g., in subpixels) may indicate a measurement distance Z to the respective surface location 790-1, 790-2 and 790-3 (e.g., in microns) via a distance calibration lookup table or the like (e.g., as may be stored in a memory portion similar to the memory portion 168 of FIG. 1). Each distance indicating coordinate DIC may be determined by various methods (e.g., by determining the centroid of intensity profile data included in a peak region, etc.). The profile data may be used to determine the DIC (e.g., with subpixel resolution).

With respect to the specific examples of FIGS. 9A, 9B and 9C, for each of the measurement channels C1, C2 and C3, the respective output spectral profile data 910-1, 910-2 and 910-3 that is provided based on the pixel data from each of the respective detector arrays 863-1, 863-2 and 863-3 is utilized to calculate a subpixel-resolution distance-indicating coordinate DIC. Each of the respective calculated distance indicating coordinates DIC-1, DIC-2 and DIC-3 indicates a respective measurement distance D1, D2 and D3 to the respective workpiece surface location 790-1, 790-2 and 790-3 (e.g., as indicated in FIG. 7), which thus corresponds to a determination of a workpiece height measurement Z1, Z2 and Z3 for each workpiece surface location 790-1, 790-2 and 790-3.

It will be appreciated that in the examples of FIGS. 4-9 as described above, that in various implementations optical fibers (e.g., as included in fiber optic cable segments) and/or similar elements are not required or utilized for transmitting light between certain components of the CRS systems (e.g., for which the optical fibers and/or optical fiber ends may have certain mounting, spatial and/or operating characteristics that may be less desirable for certain applications, including certain applications with multiple measurement channels which may increase certain complexities with regard to such issues). For example, FIGS. 4 and 5 illustrate configurations in which no optical fibers or similar components are utilized for transmitting light between any of the wavelength combining configuration WCC, the confocal light source apertures 495LS, the measurement path lens configuration 450, the confocal detection apertures 495D, and the wavelength detector 462, all of which are in fixed orientations, positions and locations relative to one another. FIG. 6 illustrates a similar configuration, except in which optical fibers OF are utilized for transmitting light from the wavelength combining configuration WCC to the confocal light source apertures 495LS. FIG. 6 thus illustrates that optical fibers may be utilized for transmitting light between certain components, if desired for certain applications. In various implementations, some or all of the above noted components of FIGS. 4-9 (e.g., the wavelength combining configuration WCC, the confocal light source apertures 495LS, the measurement path lens configuration 450, the confocal detection apertures 495D, and the wavelength detector 462) may be included in a single optical element (e.g., similar to the optical element 120 of FIG. 1, which may be an optical pen or similar optical element).

In contrast to the configurations of FIGS. 4-9, as noted above FIG. 1 illustrates a configuration (e.g., including a single measurement channel) in which an optical fiber 113 (e.g., included in fiber optic cable segment 112) may be utilized to transmit light from the light source 164 to the optical element 120, and from the optical element 120 to the wavelength detector 162. In such a configuration, the optical element 120 (e.g., an optical pen) is not required to be in a fixed orientation, position, or location relative to the wavelength detector 162 and light source 164 in order for the system to accurately perform measurement operations (e.g., for determining workpiece height measurements, etc.)

Figure 10:
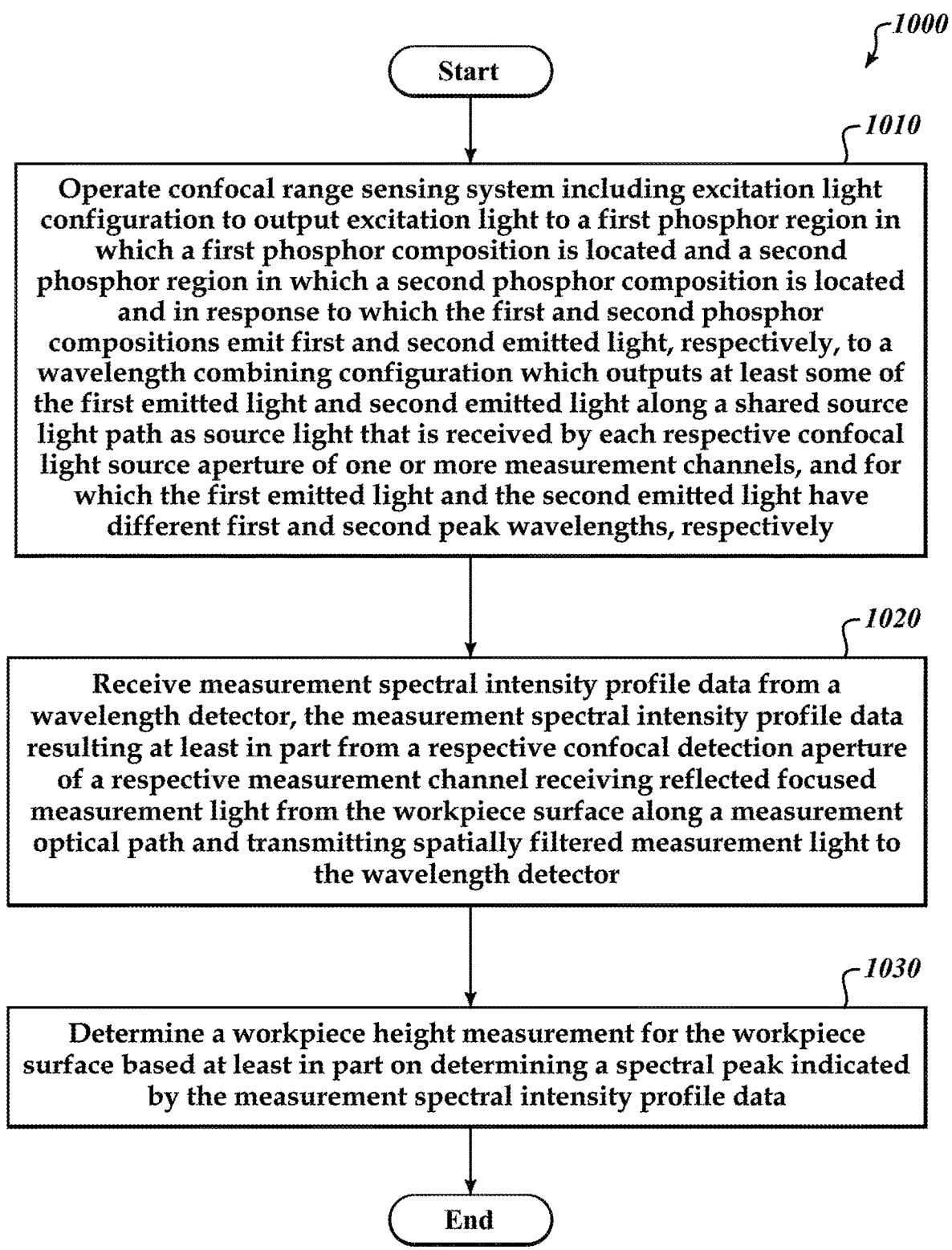
FIG. 10 is a flow diagram illustrating one exemplary implementation of a routine for operating a CRS system for determining a workpiece height measurement in accordance with principles disclosed herein.

FIG. 10 is a flow diagram illustrating one exemplary implementation of a routine 1000 for operating a CRS system in accordance with principles disclosed herein for determining a workpiece height measurement. At a block 1010, a confocal range sensing system including an excitation light configuration is operated to output excitation light to a first phosphor region in which a first phosphor composition is located and a second phosphor region in which a second phosphor composition is located. In response to the excitation light, the first and second phosphor compositions emit first and second emitted light, respectively, to a wavelength combining configuration. The wavelength combining configuration outputs at least some of the first emitted light and second emitted light along a shared source light path as source light that is received by each respective confocal light source aperture of one or more measurement channels. The first emitted light and the second emitted light have different first and second peak wavelengths, respectively. In various implementations, CRS systems may have only a single measurement channel with a single confocal light source aperture (e.g., as illustrated in FIG. 1), or may have a plurality of measurements channels which each have a corresponding confocal light source aperture (e.g., as illustrated in FIGS. 4-6).

At a block 1020, measurement spectral intensity profile data is received from a wavelength detector. The measurement spectral intensity profile data results at least in part from a respective confocal detection aperture of a respective measurement channel receiving reflected focused measurement light from the workpiece surface along a measurement optical path and transmitting spatially filtered measurement light to the wavelength detector. At a block 1030, a workpiece height measurement is determined for the workpiece surface based at least in part on determining a spectral peak indicated by the measurement spectral intensity profile data. For example, as illustrated in FIGS. 9A-9C, data from the wavelength detector may indicate a spectral peak (e.g., as indicated by a wavelength peak at a particular pixel position on the spectrometer). In various implementations, the spectral peak may thus correspond to a particular distance indicating coordinate DIC, for which a measurement distance indicating coordinate DIC (e.g., calculated by the CRS system) may be referenced to stored calibration data (e.g., in a stored lookup table or otherwise) in order to determine the corresponding measurement distance (e.g., corresponding to a workpiece height measurement). In various implementation, such CRS systems may have accuracies in the micron or sub-micron range (e.g., for the workpiece height measurements, etc.)

In various implementations, only a single workpiece height measurement may be determined at a time (e.g., such as in the configuration of FIG. 1), and for which additional workpiece height measurements may be determined as the workpiece and/or CRS system are moved relative to one another. In various implementations, the CRS system may be capable of obtaining measurement data for determining multiple workpiece height measurements (e.g., such as in the configurations of FIGS. 4-9).

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A confocal range sensing system, comprising:
a wavelength detector;
a source light configuration;
one or more measurement channels, wherein each measurement channel of the one or more measurement channels is configured to sense a respective distance to a workpiece surface and comprises:
   a respective confocal detection aperture configured to receive reflected focused measurement light from the workpiece surface along a measurement optical path and transmit spatially filtered measurement light to the wavelength detector;
   a respective confocal light source aperture that is configured to receive source light from the source light configuration and transmit at least a portion of the source light along an input path to a measurement path lens configuration that is configured to input the source light from the respective confocal light source aperture and output focused measurement light with axial chromatic dispersion to the workpiece surface and receive reflected focused measurement light from the workpiece surface and focus the reflected focused measurement light proximate to the respective confocal detection aperture;
wherein:
   the source light configuration comprises:
      an excitation light configuration comprising one or more excitation light sources that produce excitation light;
      a first phosphor composition located in a first phosphor region;
      a second phosphor composition located in a second phosphor region that is separate from the first phosphor region, wherein the first phosphor composition primarily comprises a first phosphor that emits light with a first peak wavelength in a first range of wavelengths and the second phosphor composition primarily comprises a second phosphor that emits light with a second peak wavelength in a second range of wavelengths that is different than the first range of wavelengths, and for which the second peak wavelength of the light emitted by the second phosphor is different than the first peak wavelength of the light emitted by the first phosphor;
      a wavelength combining configuration; and
      a shared source light path; wherein:
         the excitation light configuration outputs the excitation light to the first phosphor region and the second phosphor region, the excitation light simultaneously comprising first excitation light that is provided along a first excitation light path to the first phosphor region and second excitation light that is provided along a second excitation light path to the second phosphor region, and in response to which the first and second phosphor compositions emit first and second emitted light, respectively, to the wavelength combining configuration which is configured to output at least some of the first emitted light and second emitted light along the shared source light path as the source light that is received by each respective confocal light source aperture; and the first emitted light and the second emitted light have different first and second peak wavelengths, respectively.

2. The confocal range sensing system of claim 1, wherein the one or more measurement channels comprises a plurality of measurement channels.

3. The confocal range sensing system of claim 2, wherein each measurement channel comprises a lens located along the shared source light path between the wavelength combining configuration and the respective confocal light source aperture of the measurement channel, wherein each respective lens is configured to focus at least part of the first and second emitted light along the shared source light path as source light that is focused proximate to the respective confocal light source aperture.

4. The confocal range sensing system of claim 2, wherein a plurality of respective confocal light source apertures of the plurality of measurement channels are arranged in a linear configuration and the source light configuration comprises a cylindrical lens located along the shared source light path between the wavelength combining configuration and the linear configuration, wherein the cylindrical lens is configured to focus at least part of the first and second emitted light along the shared source light path as source light that is focused proximate to the linear configuration.

5. The confocal range sensing system of claim 2, wherein each measurement channel comprises a respective optical fiber having a respective fiber input end that is located to input at least some of the first emitted light and second emitted light along the shared source light path from the wavelength combining configuration and transmit that light as the source light that is received by the respective confocal light source aperture.

6. The confocal range sensing system of claim 5, wherein each respective optical fiber has a respective fiber output end which is located to provide the respective confocal light source aperture for the respective measurement channel.

7. The confocal range sensing system of claim 1, wherein the one or more measurement channels comprises a first measurement channel comprising a first optical fiber path that comprises a source fiber segment, a detector fiber segment, a confocal aperture segment and a fiber combiner/splitter, wherein:

the source and detector fiber segments are coupled to a first side of the fiber combiner/splitter and the confocal aperture segment is coupled to a second side of the fiber combiner/splitter:

the source fiber segment is configured with one end arranged to input at least some of the first emitted light and second emitted light along the shared source light path from the wavelength combining configuration, and to transmit that light to the confocal aperture segment as source light through the fiber combiner/splitter;

the confocal aperture segment is configured with a confocal aperture end arranged to:

provide both the respective confocal light source aperture that transmits the source light along the input path to the measurement path lens configuration and the respective confocal detection aperture that receives reflected focused measurement light from the workpiece surface along the measurement optical path, and transmit that reflected focused measurement light to the detector fiber segment as spatially filtered measurement light through the fiber combiner/splitter; and the detector fiber segment is configured with one end arranged to transmit the spatially filtered measurement light to the wavelength detector.

8. The confocal range sensing system of claim 1, wherein the first peak wavelength of the first emitted light and second peak wavelengths of the second emitted light are each in a wavelength range between 435 nm and 600 nm.

9. The confocal range sensing system of claim 1, wherein the source light configuration further comprises a beam splitting surface that splits at least some of the excitation light into the first excitation light and the second excitation light.

10. The confocal range sensing system of claim 9, wherein the beam splitting surface is part of a beamsplitter and the first phosphor composition in the first phosphor region is fixedly arranged relative to a first surface of the beamsplitter so as to receive the first excitation light and the second phosphor composition in the second phosphor region is fixedly arranged relative to a second surface of the beamsplitter so as to receive the second excitation light.

11. The confocal range sensing system of claim 10, wherein the first phosphor composition in the first phosphor region is coupled to the first surface of the beamsplitter and the second phosphor composition in the second phosphor region is coupled to the second surface of the beamsplitter.

12. The confocal range sensing system of claim 10, wherein the wavelength combining configuration comprises a beam combining surface which is the same surface as the beam splitting surface and which directs at least some of the first emitted light or the second emitted light along the shared source light path.

13. The confocal range sensing system of claim 1, wherein the shared source light path comprises a source light lens configuration that focuses at least part of the first and second emitted light proximate to each respective light source aperture.

14. The confocal range sensing system of claim 1, wherein the first phosphor composition in the first phosphor region comprises a first sintered phosphor composition and the second phosphor composition in the second phosphor region comprises a second sintered phosphor composition.

15. The confocal range sensing system of claim 1, wherein the first phosphor composition in the first phosphor region comprises a first ceramic phosphor and the second phosphor composition in the second phosphor region comprises a second ceramic phosphor.

16. The confocal range sensing system of claim 1, wherein the first range of wavelengths includes wavelengths between 435 nm and 565 nm.

17. The confocal range sensing system of claim 1, wherein the first emitted light has a first peak wavelength and the second emitted light has a second peak wavelength that is at least 10 nm different than the first peak wavelength.

18. The confocal range sensing system of claim 1, wherein the first emitted light has a first peak wavelength and the second emitted light has a second peak wavelength that is at least 20 nm different than the first peak wavelength.

19. The confocal range sensing system of claim 1, wherein the one or more excitation light sources comprise a laser.

20. The confocal range sensing system of claim 19, wherein the laser outputs excitation light in a wavelength range that includes wavelengths between 400 nm and 485 nm.

21. The confocal range sensing system of claim 1, wherein for each measurement channel, the respective confocal light source aperture is nominally confocal to the respective confocal detection aperture.

22. A method for operating a confocal range sensing system for determining a workpiece height measurement, the confocal range sensing system, comprising:
 a wavelength detector;
 a source light configuration;
 one or more measurement channels, wherein each measurement channel of the one or more measurement channels is configured to sense a respective distance to a workpiece surface and comprises:
  a respective confocal detection aperture configured to receive reflected focused measurement light from the workpiece surface along a measurement optical path and transmit spatially filtered measurement light to the wavelength detector;
  a respective confocal light source aperture that is configured to receive source light from the source light configuration and transmit at least a portion of the source light along an input path to a measurement path lens configuration that is configured to input the source light from the respective confocal light source aperture and output focused measurement light with axial chromatic dispersion to the workpiece surface and receive reflected focused measurement light from the workpiece surface and focus the reflected focused measurement light proximate to the respective confocal detection aperture;
 wherein:
 the source light configuration comprises:
  an excitation light configuration comprising one or more excitation light sources that produce excitation light;
  a first phosphor composition located in a first phosphor region;
  a second phosphor composition located in a second phosphor region that is separate from the first phosphor region;
  a wavelength combining configuration; and
  a shared source light path;
 the method comprising:
  operating the confocal range sensing system so that the excitation light configuration outputs excitation light to the first phosphor region and the second phosphor region, the excitation light simultaneously comprising first excitation light that is provided along a first excitation light path to the first phosphor region and second excitation light that is provided along a second excitation light path to the second phosphor region, and in response to which the first and second phosphor compositions emit first and second emitted light, respectively, to the wavelength combining configuration which outputs at least some of the first emitted light and second emitted light along the shared source light path as source light that is received by each respective confocal light source aperture, and for which the first emitted light and the second emitted light have different first and second peak wavelengths, respectively;
 receiving measurement spectral intensity profile data from the wavelength detector, the measurement spectral intensity profile data resulting at least in part from a respective confocal detection aperture of a respective measurement channel receiving reflected focused measurement light from the workpiece surface along the measurement optical path and transmitting spatially filtered measurement light to the wavelength detector; and
 determining a workpiece height measurement for the workpiece surface based at least in part on determining a spectral peak indicated by the measurement spectral intensity profile data.

23. A source light configuration for use with sensing system components to form at least part of a confocal range sensing system,
 the sensing system components comprising:
  a wavelength detector;
  one or more measurement channels, wherein each measurement channel of the one or more measurement channels is configured to sense a respective distance to a workpiece surface and comprises:
   a respective confocal detection aperture configured to receive reflected focused measurement light from the workpiece surface along a measurement optical path and transmit spatially filtered measurement light to the wavelength detector;
   a respective confocal light source aperture that is configured to receive source light from the source light configuration and transmit at least a portion of the source light along an input path to a measurement path lens configuration that is configured to input the source light from the respective confocal light source aperture and output focused measurement light with axial chromatic dispersion to the workpiece surface and receive reflected focused measurement light from the workpiece surface and focus the reflected focused measurement light proximate to the respective confocal detection aperture;
 the source light configuration comprising:
  an excitation light configuration comprising one or more excitation light sources that produce excitation light;
  a first phosphor composition located in a first phosphor region;
  a second phosphor composition located in a second phosphor region that is separate from the first phosphor region;
  a wavelength combining configuration; and
  a shared source light path; wherein:
   the excitation light configuration outputs the excitation light to the first phosphor region and the second phosphor region, the excitation light simultaneously comprising first excitation light that is provided along a first excitation light path to the first phosphor region and second excitation light that is provided along a second excitation light path to the second phosphor region, and in response to which the first and second phosphor compositions emit first and second emitted light, respectively, to the wavelength combining configuration which is configured to output at least some of the first emitted light and second emitted light along the shared source light path as the source light that is received by each respective confocal light source aperture; and the first emitted light and the second emitted light have different first and second peak wavelengths, respectively.

24. The confocal range sensing system of claim 1, wherein the first and second phosphor compositions are in fixed positions relative to the wavelength combining configuration such that the first and second phosphor compositions do not move relative to the wavelength combining configuration while the excitation light configuration outputs the excitation light to the first and second phosphor regions.

25. A confocal range sensing system, comprising:
a wavelength detector;
a source light configuration;
one or more measurement channels, wherein each measurement channel of the one or more measurement channels is configured to sense a respective distance to a workpiece surface and comprises:
  a respective confocal detection aperture configured to receive reflected focused measurement light from the workpiece surface along a measurement optical path and transmit spatially filtered measurement light to the wavelength detector;
  a respective confocal light source aperture that is configured to receive source light from the source light configuration and transmit at least a portion of the source light along an input path to a measurement path lens configuration that is configured to input the source light from the respective confocal light source aperture and output focused measurement light with axial chromatic dispersion to the workpiece surface and receive reflected focused measurement light from the workpiece surface and focus the reflected focused measurement light proximate to the respective confocal detection aperture;

wherein:
  the source light configuration comprises:
    an excitation light configuration comprising one or more excitation light sources that produce excitation light;
    a first phosphor composition located in a first phosphor region;
    a second phosphor composition located in a second phosphor region that is separate from the first phosphor region;
    a wavelength combining configuration;
    a shared source light path; and
    a beam splitting surface, wherein:
      the excitation light configuration outputs the excitation light to the first phosphor region and the second phosphor region and in response to which the first and second phosphor compositions emit first and second emitted light, respectively, to the wavelength combining configuration which is configured to output at least some of the first emitted light and second emitted light along the shared source light path as the source light that is received by each respective confocal light source aperture;
      the first emitted light and the second emitted light have different first and second peak wavelengths, respectively;
      the excitation light comprises first excitation light that is provided along a first excitation light path to the first phosphor region and second excitation light that is provided along a second excitation light path to the second phosphor region; and
      the beam splitting surface splits at least some of the excitation light into the first excitation light and the second excitation light.

\* \* \* \* \*